(12) United States Patent
Murphy et al.

(10) Patent No.: US 7,694,486 B2
(45) Date of Patent: Apr. 13, 2010

(54) DEPLOYABLE TRUSS HAVING SECOND ORDER AUGMENTATION

(75) Inventors: David M. Murphy, Santa Barbara, CA (US); Thomas W. Murphey, Albuquerque, NM (US); Michael E. McEachen, Santa Barbara, CA (US); Matthew M. Botke, Ojai, CA (US)

(73) Assignee: Alliant Techsystems Inc., Edina, MN (US)

( * ) Notice: Subject to any disclaimer, the term of this patent is extended or adjusted under 35 U.S.C. 154(b) by 1106 days.

(21) Appl. No.: 10/734,726

(22) Filed: Dec. 12, 2003

(65) Prior Publication Data
US 2005/0126106 A1 Jun. 16, 2005

(51) Int. Cl.
*E04H 12/18* (2006.01)
(52) U.S. Cl. .......................... 52/645; 52/646; 52/652.1; 52/651.04; 52/649.4; 52/649.5
(58) Field of Classification Search ................ 52/2.21, 52/2.18, 83, 81.2, 108, 121, 111, 646, 645, 52/649.4, 649.5, 651.04, 654.1, 632, 690, 52/693; 248/127, 166
See application file for complete search history.

(56) References Cited

U.S. PATENT DOCUMENTS

| | | | |
|---|---|---|---|
| 889,395 A * | 6/1908 | Noyes | 52/651.01 |
| 908,999 A * | 1/1909 | Johnson | 297/311 |
| 1,531,982 A | 3/1925 | Sago | |
| 1,637,259 A * | 7/1927 | Malone | 52/651.04 |
| 2,130,993 A | 9/1938 | Dubilier | |
| 2,405,274 A * | 8/1946 | Stites | 428/592 |
| 2,643,745 A | 6/1953 | Olszewski | |
| 2,661,082 A | 12/1953 | Ziegler | |
| 2,709,975 A * | 6/1955 | Parker | 52/650.1 |
| 2,727,220 A | 12/1955 | Buchanan et al. | |
| 2,796,299 A | 6/1957 | Freeman | |
| 2,799,368 A | 7/1957 | Alter | |

(Continued)

FOREIGN PATENT DOCUMENTS

GB 2015616 * 9/1979 ................ 52/2.18

(Continued)

OTHER PUBLICATIONS

AEC-ABLE, "New Structures for Large Sensor Array Platforms—Phase I Final Report," (Jun. 14, 2003).

(Continued)

*Primary Examiner*—Phi Dieu Tran A
(74) *Attorney, Agent, or Firm*—TraskBritt

(57) ABSTRACT

A deployable truss is formed from a plurality of column members connected at their ends where at least some of the column members are formed from column assemblies, each including a plurality of strut members that are at least connected to each other at a first and second end of the column assembly. For added rigidity, strut members of a column assembly may be connected to each other between the first and second ends using, for example, a rigidizable resin, a fixed spacer, or a deployable spacer. Connecting strut members between the ends of the column assembly provides mutual bracing to the strut members and decreases the free buckling length of the individual strut members. Spacers are preferably configured to radially space the strut members away from the longitudinal centerline of the column assembly to increase its moment of inertia, and hence its buckling strength.

26 Claims, 12 Drawing Sheets

U.S. PATENT DOCUMENTS

| | | | |
|---|---|---|---|
| 2,986,417 A * | 5/1961 | Baker | 403/281 |
| 3,012,635 A | 12/1961 | Blain | |
| 3,144,104 A | 8/1964 | Weir et al. | |
| 3,187,466 A * | 6/1965 | Zerr | 52/730.2 |
| 3,208,478 A | 9/1965 | Wadsworth | |
| 3,213,573 A | 10/1965 | Bohr et al. | |
| 3,221,464 A * | 12/1965 | Miller | 52/651.09 |
| 3,237,256 A | 3/1966 | Young | |
| 3,277,614 A * | 10/1966 | Marie | 52/2.21 |
| 3,357,457 A | 12/1967 | Myer | |
| 3,361,377 A | 1/1968 | Trexler, Jr. | |
| 3,385,397 A | 5/1968 | Robinsky | |
| 3,434,254 A | 3/1969 | Rubin | |
| 3,434,674 A | 3/1969 | Groskopfs | |
| 3,473,758 A | 10/1969 | Valentijn | |
| 3,486,279 A * | 12/1969 | Mauch | 52/108 |
| 3,503,164 A | 3/1970 | Berry et al. | |
| 3,508,587 A | 4/1970 | Mauch | |
| 3,528,543 A | 9/1970 | Robinsky | |
| 3,532,742 A * | 10/1970 | Weber et al. | 562/462 |
| 3,543,806 A | 12/1970 | Rushing et al. | |
| 3,546,049 A * | 12/1970 | Kostick | 52/650.2 |
| 3,564,789 A | 2/1971 | Vyvyan et al. | |
| 3,601,940 A | 8/1971 | Simon | |
| 3,645,146 A | 2/1972 | Nagin | |
| 3,749,133 A | 7/1973 | Bochory | |
| 3,805,462 A | 4/1974 | Capterton | |
| 3,811,633 A | 5/1974 | Cummings et al. | |
| 3,874,543 A | 4/1975 | Farnsworth | |
| 3,913,105 A * | 10/1975 | Williamson et al. | 343/840 |
| 3,937,426 A * | 2/1976 | Pearce | 244/153 R |
| 4,018,397 A | 4/1977 | Rusch et al. | |
| 4,027,440 A | 6/1977 | Hamblin | |
| 4,045,931 A | 9/1977 | Becker | |
| 4,237,662 A * | 12/1980 | Kinzler | 52/108 |
| 4,332,501 A | 6/1982 | Slysh | |
| 4,334,391 A | 6/1982 | Hedgepeth et al. | |
| 4,337,560 A | 7/1982 | Slysh | |
| 4,386,485 A | 6/1983 | Kramer | |
| 4,475,323 A * | 10/1984 | Schwartzberg et al. | 52/111 |
| 4,480,415 A | 11/1984 | Truss | |
| 4,504,175 A | 3/1985 | Zion | |
| 4,524,552 A | 6/1985 | Hujsak | |
| 4,532,742 A | 8/1985 | Miura | |
| 4,539,786 A | 9/1985 | Nelson | |
| 4,557,083 A | 12/1985 | Zanardo | |
| 4,557,097 A | 12/1985 | Mikulas, Jr. et al. | |
| 4,569,176 A | 2/1986 | Hedgepeth et al. | |
| 4,574,535 A * | 3/1986 | Pabsch | 52/118 |
| 4,578,919 A * | 4/1986 | Amadon et al. | 52/645 |
| 4,587,777 A | 5/1986 | Vasques et al. | |
| 4,599,832 A | 7/1986 | Benton et al. | |
| 4,612,750 A * | 9/1986 | Maistre | 52/638 |
| 4,614,502 A | 9/1986 | Nelson | |
| 4,637,180 A | 1/1987 | Zeigler | |
| 4,651,480 A | 3/1987 | Kramer | |
| 4,655,022 A | 4/1987 | Natori | |
| 4,662,130 A | 5/1987 | Miura et al. | |
| 4,676,032 A * | 6/1987 | Jutras | 52/2.17 |
| 4,677,803 A | 7/1987 | Mikulas, Jr. et al. | |
| 4,686,134 A | 8/1987 | Ono | |
| 4,725,025 A | 2/1988 | Binge et al. | |
| 4,783,936 A * | 11/1988 | Hujsak | 52/108 |
| 4,866,893 A | 9/1989 | McGinnis | |
| 4,918,884 A | 4/1990 | Okazaki et al. | |
| 4,920,710 A | 5/1990 | Paine | |
| 4,958,474 A * | 9/1990 | Adams | 52/646 |
| 4,969,301 A | 11/1990 | Warden | |
| 5,016,418 A | 5/1991 | Rhodes et al. | |
| 5,056,278 A | 10/1991 | Atsukawa | |
| 5,094,046 A | 3/1992 | Preiswerk | |
| 5,154,027 A | 10/1992 | Warden | |
| 5,167,160 A | 12/1992 | Hall, II | |
| 5,168,679 A | 12/1992 | Featherstone | |
| 5,235,788 A | 8/1993 | Maimets | |
| 5,267,424 A | 12/1993 | Douglas | |
| 5,347,770 A | 9/1994 | McDonnell et al. | |
| 5,355,643 A | 10/1994 | Bringolf | |
| 5,803,418 A | 9/1998 | Bringolf et al. | |
| 5,857,648 A | 1/1999 | Dailey et al. | |
| 5,921,048 A | 7/1999 | Francom et al. | |
| 5,977,932 A | 11/1999 | Robinson | |
| 6,076,770 A * | 6/2000 | Nygren et al. | 244/159.5 |
| 6,112,474 A | 9/2000 | Paine | |
| 6,175,989 B1 | 1/2001 | Carpenter et al. | |
| 6,230,428 B1 | 5/2001 | Albin | |
| 6,256,938 B1 | 7/2001 | Daton-Lovett | |
| 6,321,503 B1 * | 11/2001 | Warren | 52/658 |
| 6,343,442 B1 | 2/2002 | Marks | |
| 6,345,482 B1 * | 2/2002 | Warren | 52/646 |
| 6,374,565 B1 | 4/2002 | Warren | |
| 6,453,973 B1 | 9/2002 | Russo | |
| 6,560,942 B2 | 5/2003 | Warren et al. | |
| 6,571,914 B2 | 6/2003 | Lee et al. | |
| 6,647,668 B1 | 11/2003 | Cohee et al. | |
| 6,701,679 B2 | 3/2004 | Zazula et al. | |
| 6,843,029 B2 | 1/2005 | Breitbach et al. | |
| 6,904,722 B2 | 6/2005 | Brown et al. | |
| 6,910,304 B2 | 6/2005 | Warren | |
| 6,920,722 B2 | 7/2005 | Brown | |
| 6,931,812 B1 * | 8/2005 | Lipscomb | 52/653.1 |
| 7,028,442 B2 * | 4/2006 | Merrifield | 52/651.1 |
| 2002/0112417 A1 | 8/2002 | Brown et al. | |
| 2004/0194397 A1 | 10/2004 | Brown et al. | |
| 2004/0220004 A1 | 11/2004 | Bourc'His | |

OTHER PUBLICATIONS

AEC-ABLE, "NASA SBIR Phase 2 Proposal for New Structures for Large Sensor Array Platforms: Hardware Development of Second-order Augmentation of Lattice Trusses" (Jul. 14, 2003).

R.F. Crawford, "Strength and Efficiency of Deployable Booms for Space Applications," AAS/AIAA Variable Geometry and Expandable Structures Conf., Anaheim, Calif., AIAA Paper No.

PowerPoint Slides used in a Dec. 12, 2002 Briefing by AEC-ABLE to the National Reconnaissance Organization.

Thomas W. Murphey, "Performance Trends in Hierarchical Space Structures," posted to AEC-Able's Website Apr. 2002.

J.D. Lincoln Inc., Product Data Sheet for L-695, Cyanate Ester Prepreg, http://www.jdlincoln.com., copyright 1999-2005.

JPS Glass, "Advanced Composites," http://www.jpsglass.com/advanced.htm., (no date).

U.S. Appl. No. 11/080,357, filed Mar. 15, 2005, entitled Deployable Structural Assemblies, Systems for Deploying Such Structural Assemblies and Related Methods.

U.S. Appl. No. 11/400,718, filed Apr. 7, 2006, entitled Deployable Structural Assemblies, Systems for Deploying Such Structural Assemblies and Related Methods.

* cited by examiner

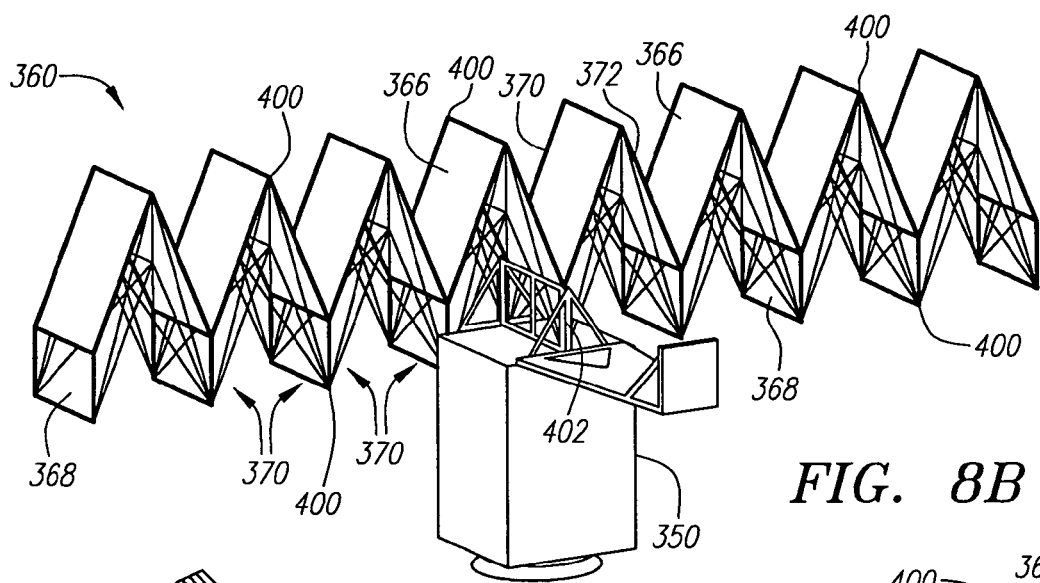
FIG. 8B
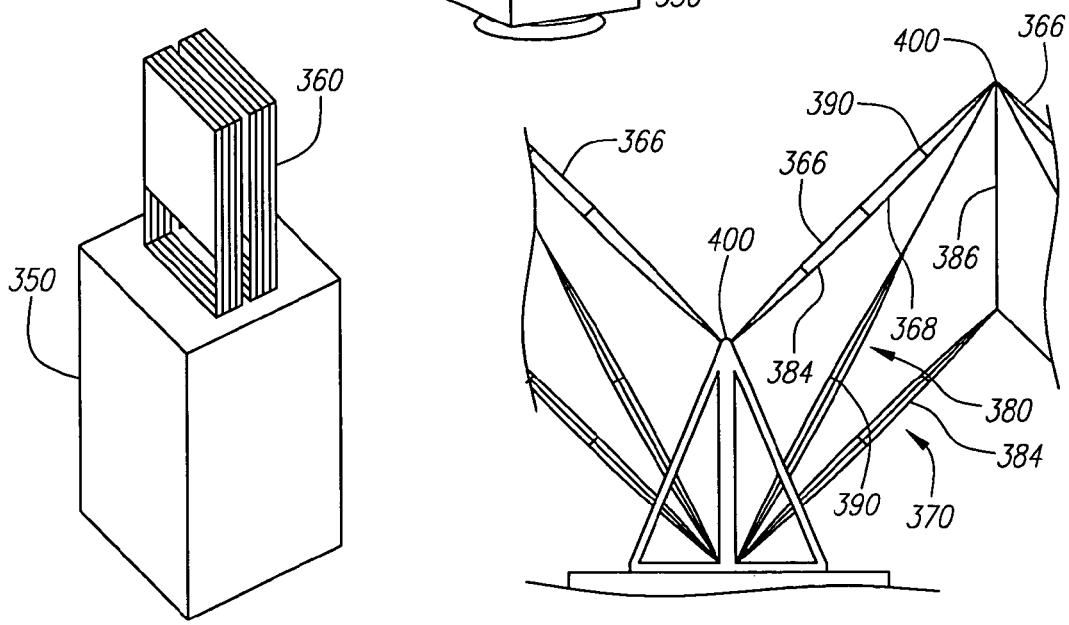
FIG. 8A
FIG. 8C
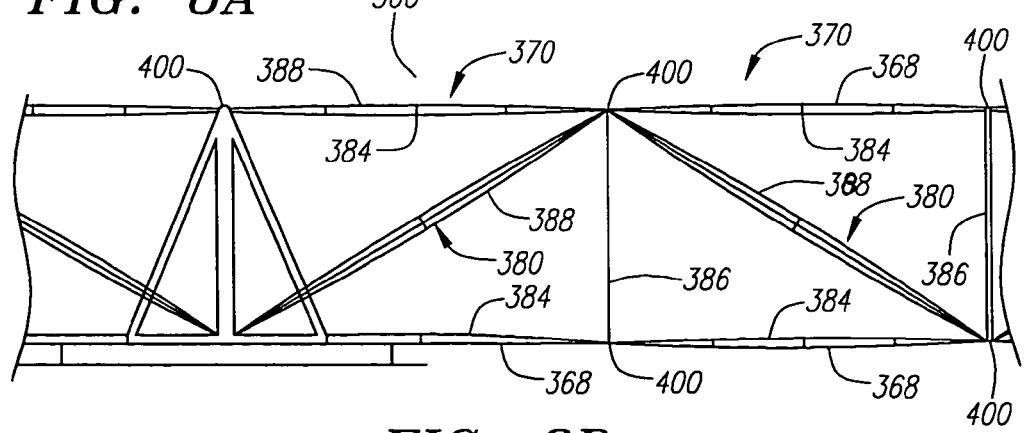
FIG. 8D

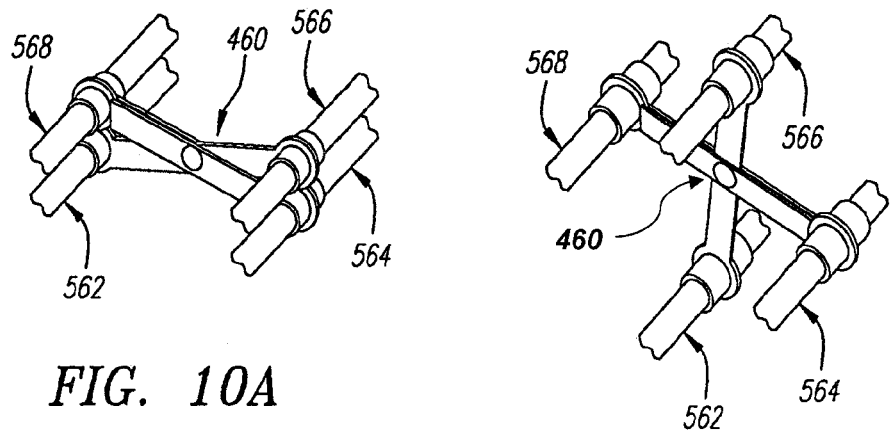
FIG. 10A
FIG. 10B
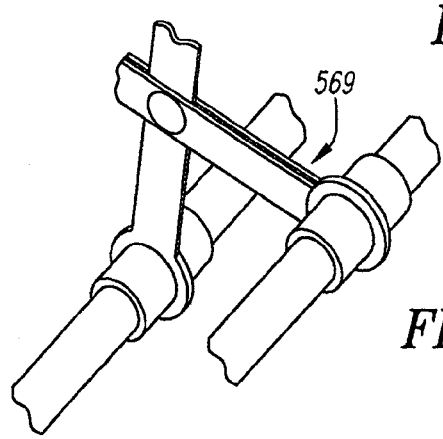
FIG. 10C
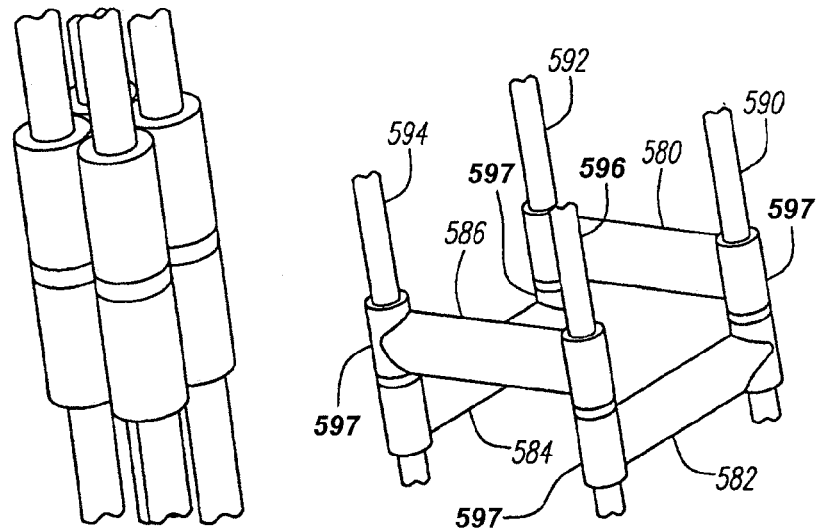
FIG. 11A
FIG. 11B

DEPLOYABLE TRUSS HAVING SECOND ORDER AUGMENTATION

FIELD OF THE INVENTION

The present invention relates to the field of extendible truss structures and, more particularly, to lightweight deployable truss structures used in space applications.

BACKGROUND OF THE INVENTION

Deployable structures made for use in space have generally been linearly deployed systems extended from a fixed base. These structures are commonly referred to as booms and can be divided into two categories: shell and lattice booms. Successful designs share traits of mass efficiency, low packaged volume, and reliability.

One specific type of a shell boom, referred to as a STEM in the space industry, for Storable Tubular Extendable Member, is disclosed in U.S. Pat. No. 3,144,104. A STEM, which typically incorporates a coilable thin metal strip, such as shown in the figures of U.S. Pat. No. 3,144,104, are precurved and form a cylindrical shell when deploying. These devices have found use in low load applications such as antennas and gravity gradient stabilization booms due to their compactness.

In general, a cylindrical shell, or tube, is a simple and mass efficient structure. However, STEMs have strength limitations since the deployed metal strip does not form a closed section. Multiple overlapped STEMs, such as those shown in various figures of U.S. Pat. No. 3,434,674 and methods of interlocking the overlapped section(s) (see, e.g., FIG. 8 of U.S. Pat. No. 3,144,104) have been pursued to increase strength.

STEMs are also limited in utility due to susceptibility to thermally induced bending. In space applications, one side of the STEM can be heated by solar radiation while the other side of the STEM would be shielded from solar radiation by the first side of the STEM. Such inconsistent heating could cause the side of the STEM receiving the solar radiation to expand more than the shielded side of the STEM, resulting in thermal induced bending, and distortion, of the STEM. Distortions in booms are generally undesirable and, in particular, distortions can reduce axial load capability.

A boom loaded axially, as a column, must be very straight to obtain full load capability. In practice, therefore, the ratio of the length to diameter of a boom is generally kept below the point where factors such as manufacturing straightness errors, thermal bending, and unintended minor load eccentricities leave the boom susceptible to collapse by buckling. While such factors will generally depend, at least in part, on the material system used to fabricate the boom, typically the length to diameter ratio of booms that are loaded as columns is maintained well below 80.

For long booms with moderate load and/or higher stiffness requirements, larger diameters are required to limit the slenderness ratio. However, using a boom comprised of a simple thin-walled cylinder will not be mass optimized, if the required wall thickness of the boom is greater than the optimal wall thickness required to meet stiffness requirements. This situation occurs when the optimal wall thickness required to meet stiffness concerns is so thin that the boom wall would have unreliable strength properties due to small manufacturing imperfections in the boom wall. Such imperfections are difficult to avoid and to predict. In addition, as optimum wall thickness decreases, such imperfections are more likely to initiate failure by local wall buckling from loads well below the bulk properties of the material being used to fabricate the boom. This limits the usefulness of thin-walled tubular shell booms, such as STEMs, and is one impetus for using a range of lattice type boom structures in space applications.

A lattice boom typically comprises a number of axially arranged structural elements, which are frequently referred to as longerons. Typically, the longerons are braced in a repeating fashion at intervals often referred to as bays. The longerons are typically rods, or sometimes tubes, and are braced at close intervals to prevent slenderness concerns from arising at the bay level. Structural members used to perform the bracing function are often referred to as battens. Diagonals, or as also sometimes referred to as stays or cross-members, are typically provided along each face of the bays to add structural rigidity. Diagonals, for example, may be in the form of crossing cables, each bearing tension only, or one or more rigid structural members capable of bearing both tension and compression.

One bay of a typical collapsible four-sided lattice structure is shown in FIG. 1 of U.S. Pat. No. 5,016,418, issuing to Rhodes et al., the disclosure of which is hereby incorporated by reference. Each bay, or structural unit, is constructed of structural members connected with hinged and fixed connections at connection nodes in each corner of the bay. Diagonal members along each face of the bay provide structural rigidity and are equipped with mid-length, self-locking hinges to allow the structure to collapse. Many other clever schemes for the articulated folding of repeating bay booms, or truss structures, have been arranged.

For example, U.S. Pat. No. 4,475,323, issuing to Schwartzberg et al., which is incorporated herein by reference, discloses a deployable box truss hoop. U.S. Pat. No. 4,557,097 to Mikulas, Jr. et al., which is also hereby incorporated by reference, discloses a sequentially deployable, maneuverable tetrahedral beam truss structure. U.S. Pat. No. 4,569,176 to Hedgepeth et al., hereby incorporated by reference, discloses a deployable lattice column having three sides and rigid diagonal members formed of rigid elements. U.S. Pat. No. 4,599,832 to Benton et al. ("Benton"), hereby incorporated by reference, discloses an extendible structure that can be collapsed to a shorter length and extended to a longer length. The extendible structure disclosed in Benton comprises a pair of station members interconnected by at least three longeron members. Each longeron member has two longeron elements that are pivoted together so they can fold toward one another or be aligned to form a column. Each longeron element is pivoted to a respective station member. Preloaded diagonal cable stays rigidify the structure when extended, being opposed by buckling springs (or Euler columns) that exert a radially outward resultant force in each bay at the folding point of each longeron member. The articulated lattice configuration disclosed in Benton was used to deploy the solar arrays on the international space station.

Another example of a repeating bay boom or truss structure comprised of collapsible bays formed from articulating members is provided in U.S. Pat. No. 4,677,803 to Mikulas, Jr. et al. ("Mikulas"), which is hereby incorporated by reference. The Mikulas patent discloses a deployable geodesic truss structure. The Mikulas geodesic truss structure includes a series of bays, each bay having sets of battens connected by longitudinal cross-members that give the bay its axial and torsional stiffness. The cross-members are hinged at their mid-point by a joint so that the cross-members are foldable for deployment or collapsing. Hinged longerons may also be provided to connect the sets of battens and to collapse for stowing with the rest of the truss structure. U.S. Pat. No.

5,267,424, issuing to Douglas, and which is hereby incorporated by reference, discloses a "bay" or, as referred to in the patent, a "module" for forming an articulated stowable and deployable mast. Further, U.S. Pat. No. 6,076,770 to Nygren et al., which is hereby incorporated by reference, discloses a folding truss that comprises a number of articulating column members.

Favored designs of articulated truss structures for space applications share traits of high performance in mass efficiency, low packaged volume, and reliability. Joint design is also important to performance of articulated truss structures since joints typically carry risks of reliability, increase the mass of the structure, and limit compaction.

An alternative lattice truss structure with joint-less longerons, and hence higher compaction and lower risk, is the coilable lattice truss boom. Numerous adaptations of this often employed structure exist. For example, U.S. Pat. No. 4,918,884 to Okazaki et al., which is hereby incorporated by reference, discloses an example of a coilable lattice truss that employs a plurality of radial spacers to define bays along a plurality of longerons arranged parallel to one another and attached to a pair of endplates. A pair of diagonal cords are stretched between adjacent radial spacers, between one of the end plates and the uppermost radial spacer and between the other of the end plates and the lowest radial spacer, respectively. A means is attached to one of the paired diagonal cords stretched between one of the end plates and the uppermost or lowest radial spacer to apply a predetermined tension to the diagonal cord. To collapse the truss structure, the longerons are elastically buckled between the radial spacers so as to coil the longerons between the endplates. The transforming of the longerons, and longitudinal position of the radial spacer located at one end of the structure, can be restrained by a means of applying overall axial tension while the structure is being deployed or collapsed. Other examples of coilable lattice truss booms are described in U.S. Pat. No. 3,486,279 to Webb for a deployable lattice column; U.S. Pat. No. 4,334,391 to Hedgepeth et al. for a redundant deployable lattice column; U.S. Pat. No. 4,532,742 to Miura for an extendible structure; and U.S. Pat. No. 5,094,046 to Preiswerk for a deployable mast.

Because the longerons in coilable lattice booms are highly strained when coiled for stowage, the material of choice for such longerons is typically a flexible glass fiber composite, such as an S2 glass fiber composite. As a result, in typical performance regimes, current coilable truss designs possess far in excess of a desirable amount of stowed strain energy, resulting in excessive push forces. This, in turn, requires the use of equipment sized to handle the resulting push force while the truss is in the stowed configuration, as well as when it is being deployed or collapsed. The required additional mass of the deployment mechanism to safely handle the push force of current coilable trusses adds parasitic mass and limits their overall mass efficiency.

Articulated and coilable lattice truss structures have been successful to date in providing low mass solutions to a wide array of lightly-loaded truss structures (relative to terrestrial structures) for use in space applications. But many potential space applications, including, for example, even more lightly loaded or "gossamer" applications and imaging mission applications requiring lightweight and stable structures, call for extendible structures having compaction, stability, and/or mass efficiency requirements that are outside the capabilities of existing structures or are not easily met by such structures. Accordingly, the ever increasingly challenging requirements for compaction, stability, and mass efficiency call for new generation extendible structure solutions.

High-performance graphite fiber composites potentially provide a huge gain in stiffness to weight capability over other available material options, such as flexible glass fiber composites, such as S2 glass fiber composites, and possess very low coefficients of thermal expansion. These are critical traits for future stable gossamer structures. Graphite fiber composite materials have limited applicability in known coilable lattice structures because graphite fiber composite materials have strain capabilities typically two to three times lower than glass fiber composite materials. Therefore, only much smaller, and hence weaker, longer rods can withstand the curvature encountered during stowage. The local buckling strength of a longeron is a function of the rod inertia, which is proportional to the diameter to the fourth power. This limits the utility of graphite composite longerons in currently practiced coilable lattice structure because the maximum diameter graphite longeron (approximately ⅓ that of an S2 glass fiber longeron) that can be used in known coilable structures would possess up to approximately 80 times less inertia. Even granting that a graphite rod is likely to be as much as 4 times stiffer in extensional modulus than a S2 rod, the buckling strength will still be 20 times lower than the heritage material (assuming equal column length).

Graphite fiber composite elements such as rods, and in larger structures, tubes, have been well utilized in articulated lattice structures in recent years. But, as always, the stacking of individual longeron elements restricts compaction capability because slenderness limits constrain the minimum realistic diameter of the longeron elements.

In recent years, numerous inflatable systems, which can use graphite fiber composites, have been under intense development in the hope that such systems would achieve a leap in mass and packaging efficiency, allowing ever larger systems to be packaged within the constraints of affordable launch systems. In practice, it has been difficult to achieve the structural efficiency of an articulated structure with an inflatable system due to mass overhead in non-structural systems such as: bladder materials, thermal barrier layers, node fittings, and inflation equipment and sequencing mechanisms. Inflatable systems are also plagued with structural inefficiencies inherent with the use of folding or rolling collapsed composite tubes. To allow the folding or rolling of collapsed composite tubes, the graphite material must be capable of withstanding high strain, requiring a reduction in fiber stiffness, fiber-to-matrix volume ratios, and/or the use of a woven fabric, which reduces the effective stiffness.

High performance tubular composite systems require composite tubes with maximum structural stiffness and high stability. Composite tubes achieve maximum structural efficiency when constructed from layered-fibers mostly oriented nearly axially to the lengthwise direction of the tube. The most stable composite tube lattice structure would be joined by bonding at composite nodes. However, such systems are not generally collapsible, although some have been proposed. One such proposed system is described in U.S. Pat. No. 6,321,503 to Warren. The mass efficiency of this system is high and the structure is stable, but the compaction ratio is poor. Allowing the tubes to be partially flattened, as described in U.S. Pat. No. 6,343,442 to Marks, increases the compaction, but it is still not satisfactory.

Inflatables, folded, and flattened lattice structures do not have precise kinematics and suffer from reduced stiffness and strength during deployment. Articulated lattice structures have precise kinematics that can be controlled by separate actuators and rate limiting devices. The reliability inherent in the heritage methods of deploying articulated lattice structures is also a key performance parameter. Reliability is another fundamental criteria in the creation of a desirable deployable structure for use in space applications, alongside mass efficiency, compact stowage performance, and stability.

A need, therefore, exists for deployable truss structures that improve on one or more of the above noted deficiencies of currently known deployable truss structures, yet maintain the reliable deployment characteristics of articulated and coilable lattice structures. Preferably, such truss structures would also improve on at least one of the attributes of mass efficiency, stowage volume, and thermal stability, and preferably all three. A need also exists for such structures that can make practical use of high-performance graphite fiber elements. A need further exists for column members that will enable improved deployable truss structures to be built.

An object of the present invention is to meet one or more of the foregoing needs.

SUMMARY OF THE INVENTION

To the foregoing end, one aspect of the present invention is directed to deployable truss structures comprising a plurality of column members connected at their ends to form a deployable truss that forms a truss structure when in a deployed state and that has a stowage volume less than, and preferably substantially less than, its deployed volume when in the collapsed state, wherein at least some of the column members comprise column assemblies, each including a plurality of strut members connected to each other at a first end of the column assembly and at a second end of the column assembly.

The terms truss and truss structure are used herein to refer to a framework composed of structural members joined at their ends to form a rigid structure, and wherein each structural member is generally subjected to only longitudinal stresses, either tension or compression or both. The phrase "rigid structure," however, is not intended to imply that the truss structures of the present invention are devoid of flexibility, but rather to imply that the resulting truss structures have some quantifiable bending stiffness, and preferably sufficient bending stiffness and strength for its intended application.

The phrase "column members" is used herein to refer to structural members of the truss designed to resist both compressive and tensile axial forces.

The use of column assemblies comprised of a plurality of discrete struts, such as rods or tubes, as column members in the deployable trusses of the present invention provides, from a hierarchical standpoint, a second level or order of augmentation to the global truss when deployed. This is because a truss structure having a higher-order arrangement is created, and, in particular, one of at least a second order of hierarchy. As such, the present invention is directed to deployable truss structures having at least second-order augmentation.

For added rigidity, strut members of a column assembly may be connected to each other between the first and second ends using, for example, a rigidizable resin, a fixed spacer, or a deployable spacer. Connecting strut members between the ends of a column assembly provides mutual bracing to the strut members and decreases the free buckling length of the individual strut members. Spacers may be used to radially space the strut members away from the longitudinal centerline of a column assembly to increase its moment of inertia, and hence its buckling strength.

Moreover, graphite fiber elements manufactured from high modulus fibers with axial or near-axial alignment can be used as strut members in the column assemblies of the deployable trusses according to the present invention. Use of such elements will maximize structural efficiency and thermal stability of the deployable truss.

The column assemblies themselves preferably comprise open lattice structures that can be nested to achieve high compaction ratios and which in various embodiments, may include deployable or non-deployable spacers. When the column assemblies comprise an open lattice structure, their preferred form is a column tapered at each end to minimize node fitting size and mass. In other embodiments of the invention, however, the column assemblies may simply comprise column members formed from a bundle of rods or tube members connected at their ends or truss nodes.

In one embodiment of the present invention, an articulated deployable boom truss is provided. Augmenting a deployable articulated lattice boom with column assemblies of the present invention permits the continued use of reliable heritage kinematic solutions during the deployment of the augmented boom. Articulated boom trusses of the present invention provide structural determinacy during deployment comparable to heritage systems. Additionally, graphite fiber construction can be optimally employed in the articulated boom systems of the present invention for even greater improvements in mass efficiency, stowage volume, and/or thermal stability over heritage articulated boom truss systems.

In another embodiment of the present invention, a coilable boom truss is provided in which the longerons comprise three or more strands. Preferably, the strands are spaced apart intermittently along the length of the longeron using a deployable or non-deployable spacer. Moreover, graphite fiber construction may be advantageously employed in the coilable boom trusses of the present invention.

Other deployable planar and space truss structures, including, for example, planes, hoops, or dishes, may also be constructed using the column assemblies of the present invention to provide second order augmentation.

In another aspect of the invention, a column assembly for use in a deployable truss is provided. In a preferred embodiment, the column assembly comprises a plurality of strut members rigidly connected to each other at a first end of the column assembly and at a second end of the column assembly. The strut members are also connected at one or more locations, and preferably continuously, between the first and second ends of the column assembly with a rigidizable resin. The rigidizable resin may, for example, be a UV curable resin or a thermoplastic resin. In another preferred embodiment, the column assembly comprises a plurality of strut members connected to each other at a first end of the column assembly and at a second end of the column assembly. The column assembly also includes a spacer connecting the strut members of the column assembly at a location between the first and second ends of the strut members and that is capable of radially spacing the strut members away from the longitudinal centerline of the column assembly a distance greater than the first and second ends of the strut members are positioned from the centerline of the column assembly.

Other aspects, objects, features, and advantages of the invention will become apparent to those skilled in the art from the following detailed description of the preferred embodiments of the invention taken together with the drawings.

BRIEF DESCRIPTION OF THE DRAWINGS

FIG. 1A illustrates a $0^{th}$-order structure, FIG. 1B illustrates a first-order structure, and FIG.

1C illustrates a second-order structure according to one aspect of the present invention.

FIGS. 2A-2D are a series of schematic illustrations of cross-sections of different column arrangements.

Figure 3:
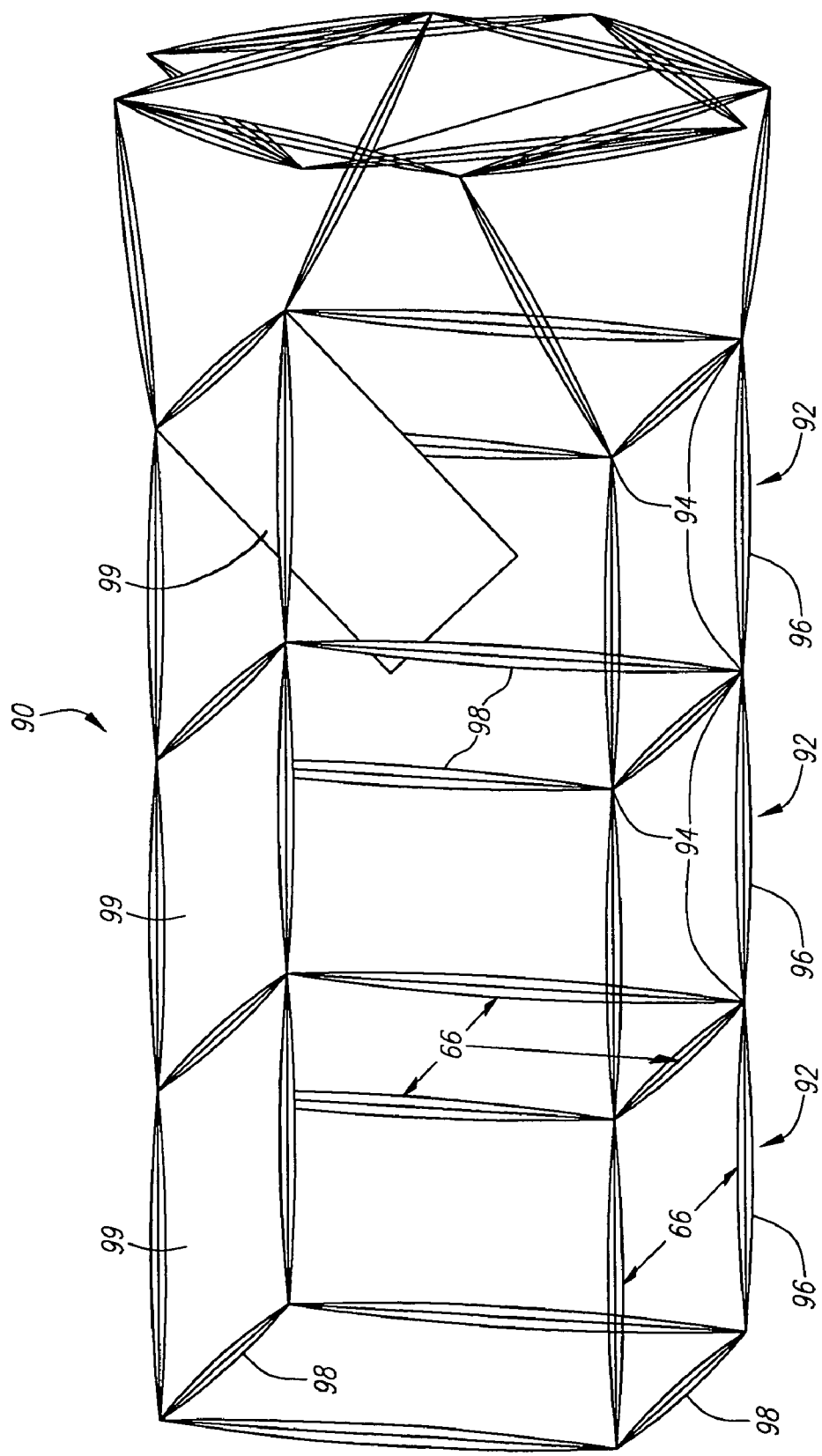

FIG. 3 is a perspective view of a deployable articulating truss structure according to one embodiment of the present invention.

Figure 4:
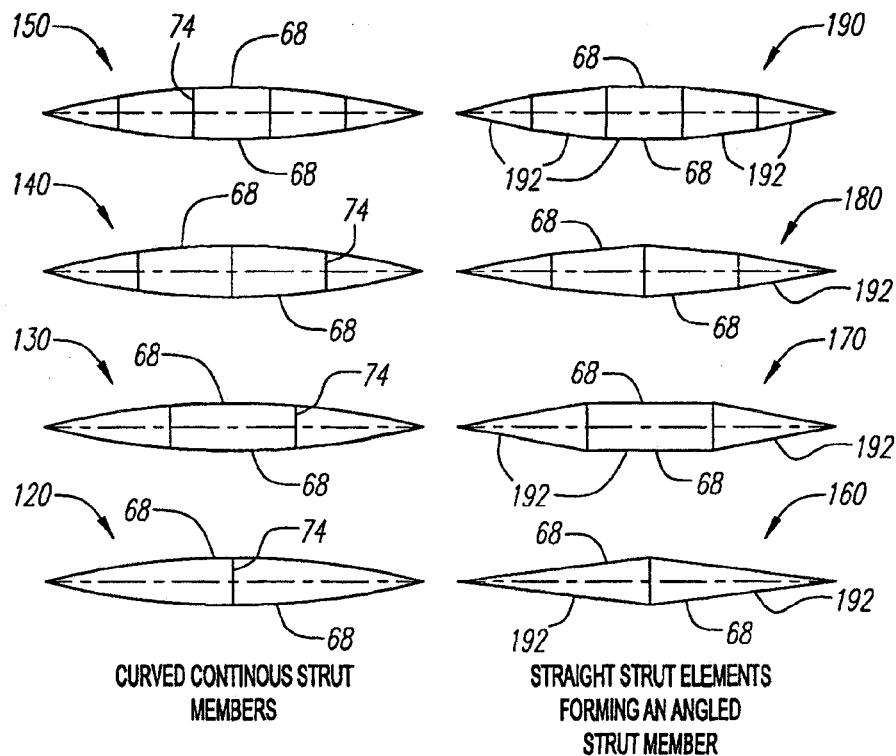

FIG. 4 is a schematic representation of various embodiments of column assemblies according to the present invention having different levels of intermediate bracing.

Figure 5:
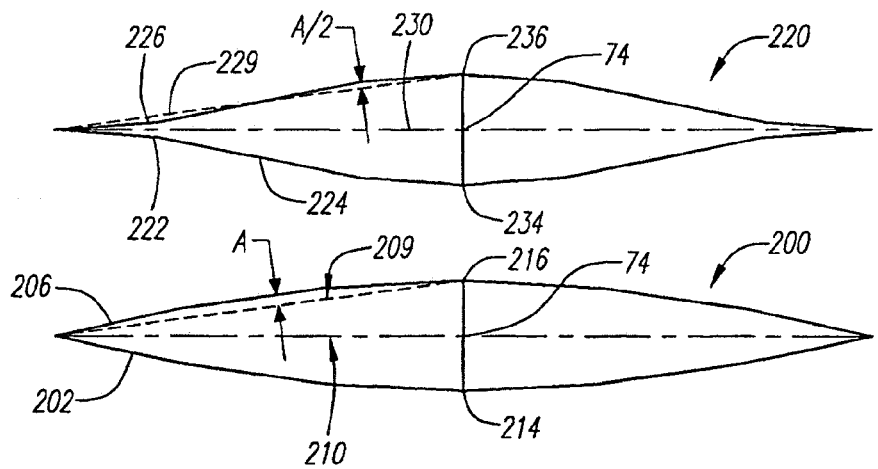

FIG. 5 is a schematic representation illustrating how the eccentricity of column assemblies according to the present invention can be affected by the manner in which strut members are tapered toward the ends of the column assemblies.

FIGS. 6A-6D are a series of schematic illustrations showing the nesting of column assemblies according to the present invention having different numbers of strut members and various fixed spacer designs to support the strut members.

Figure 7:
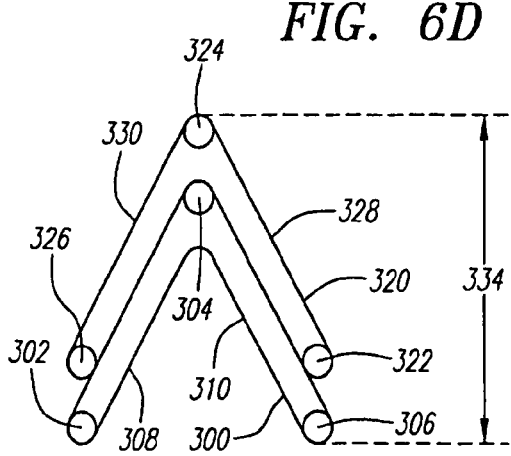

FIG. 7 is a schematic illustration showing the nesting of column assemblies according to the present invention having three strut members and a fixed V-shaped spacer.

FIGS. 8A-8D are various views of a deployable articulating boom truss structure according to the present invention. FIG. 8A is a perspective view of a deployable truss structure according to the present invention in its collapsed state attached to a satellite. FIG. 8B is a perspective view of the entire structure during deployment of the truss structure. FIG. 8C is a partial side view of the truss structure during deployment. FIG. 8D is a partial side view of the structure in a deployed position.

FIGS. 9A-9F illustrate various deployable spacers that can be used to space strut members in column assemblies according to the present invention.

FIGS. 10A-10C illustrate the deployment of a column assembly having a deployable spacer according to one embodiment of the invention.

FIGS. 11A and 11B illustrate the deployment of a column assembly having a deployable spacer according to another embodiment of the invention.

Figure 12A:
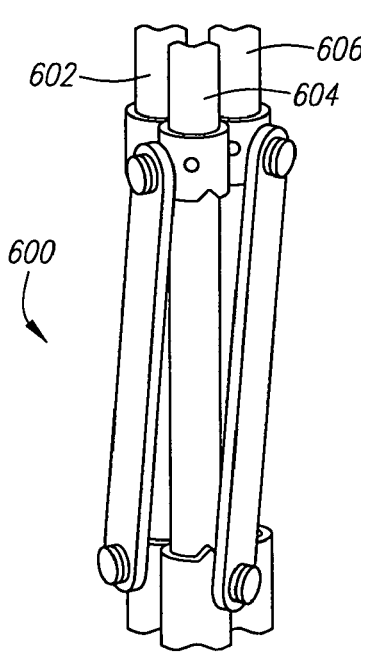
Figure 12B:
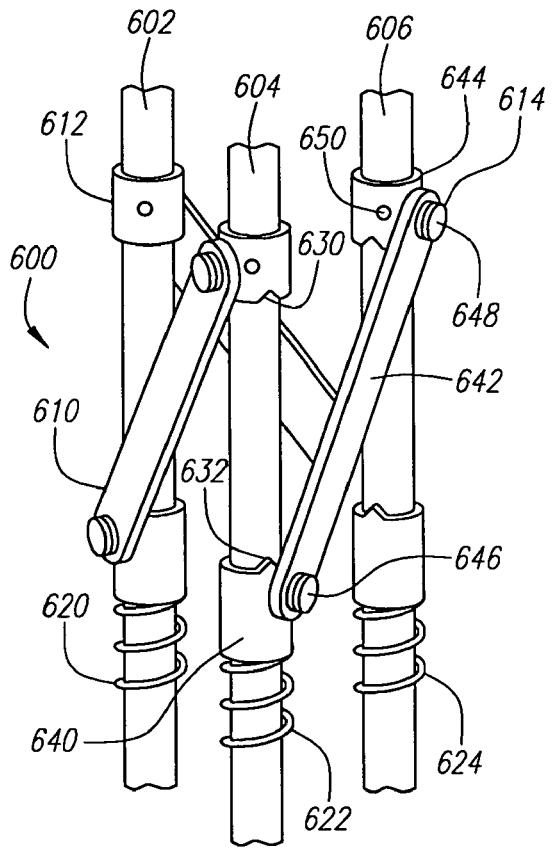
Figure 12C:
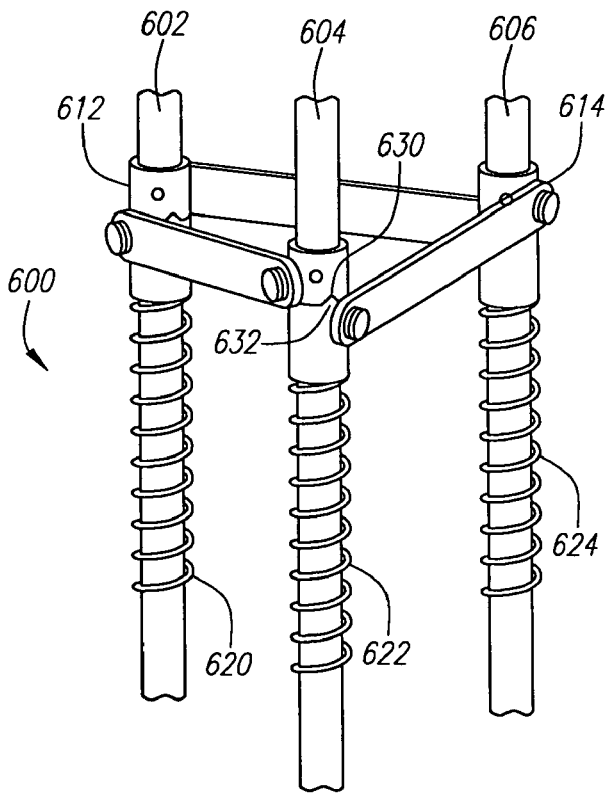

FIGS. 12A-12C illustrate the deployment of a column assembly having a deployable spacer according to yet another embodiment of the invention.

Figure 13:
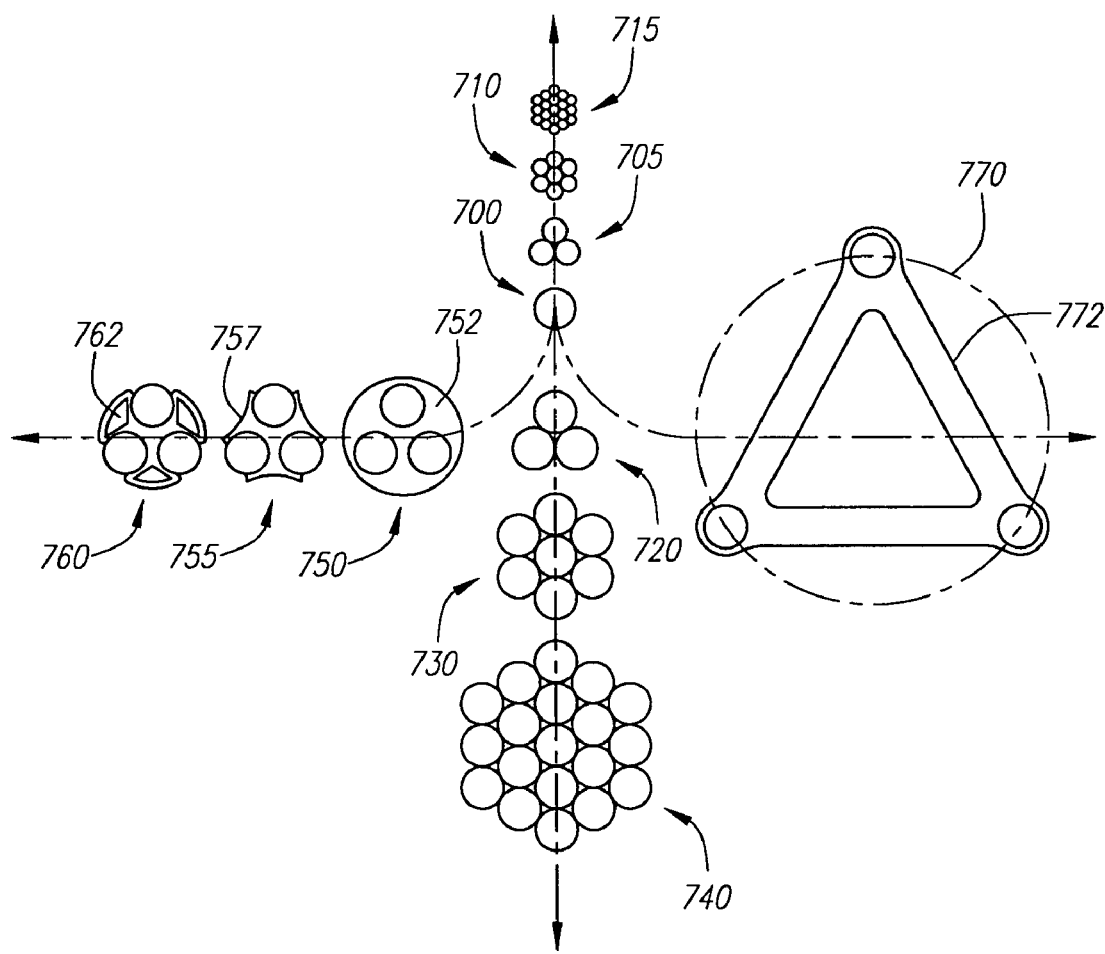

FIG. 13 is a schematic representation illustrating various stranding options for strut members in column assemblies according to the present invention.

Figure 14:
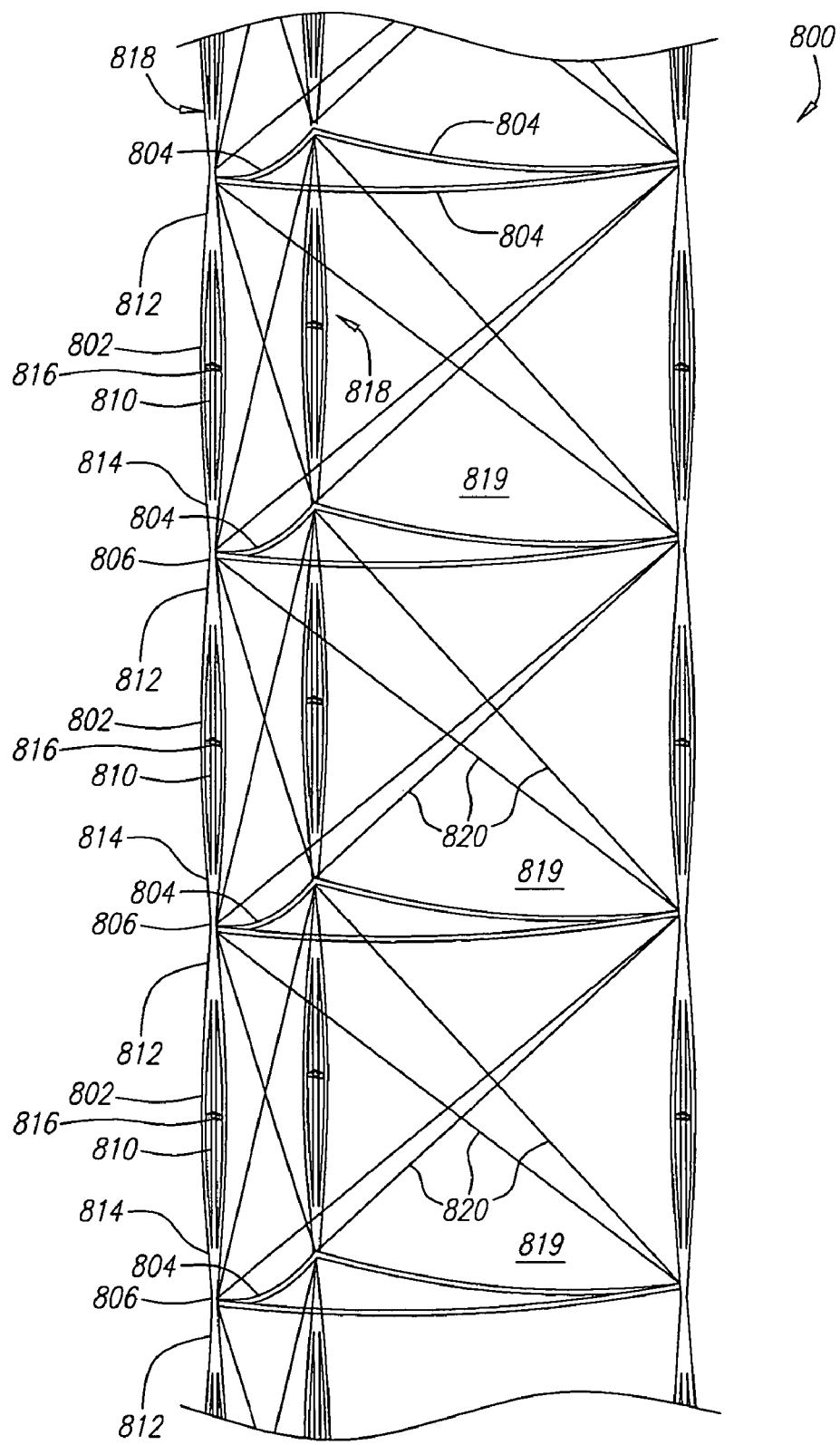

FIG. 14 is a perspective view of a portion of a coilable truss according to one embodiment of the present invention.

Figure 15:
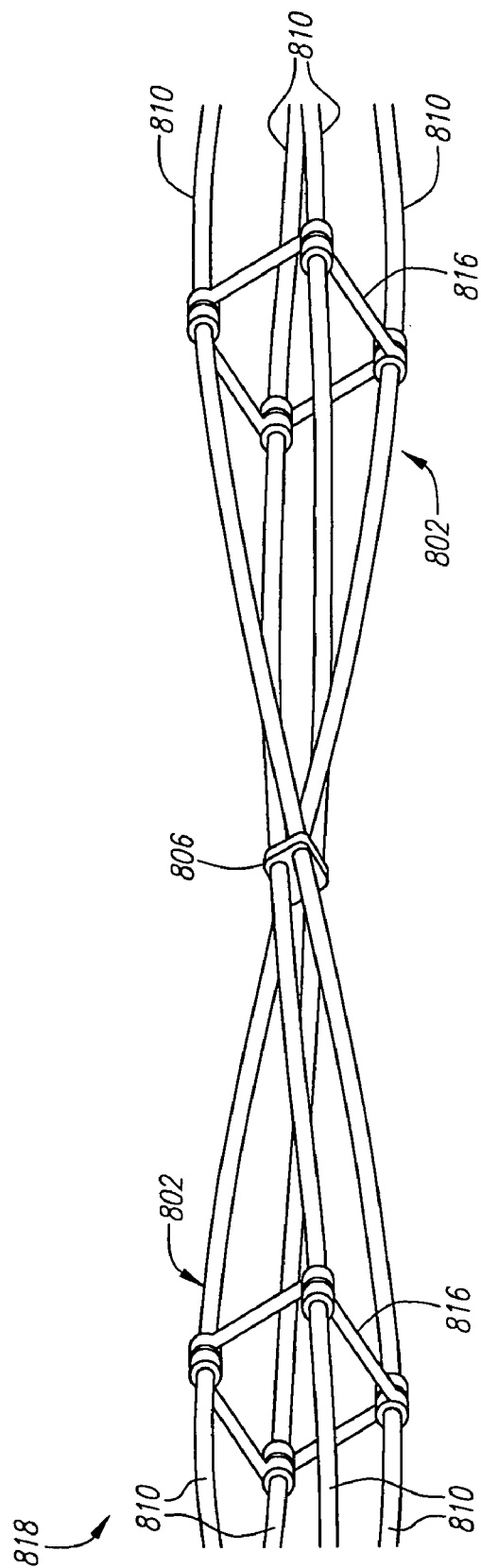

FIG. 15 is a partial perspective view of one embodiment of a coilable longeron according to the present invention.

DETAILED DESCRIPTION OF THE PREFERRED EMBODIMENTS

The preferred embodiments of the invention will now be described with reference to the drawings. To facilitate description, reference numerals designating an element in one figure will represent the same element in any other figure.

Historically, lattice boom trusses have been more effective than simple beams consisting of a rod or tube in lightly loaded space deployable applications. The present invention further improves key performance metrics of lightly loaded deployable trusses for use in space by employing secondary augmentation.

Figures 1A, 1B, 1C:
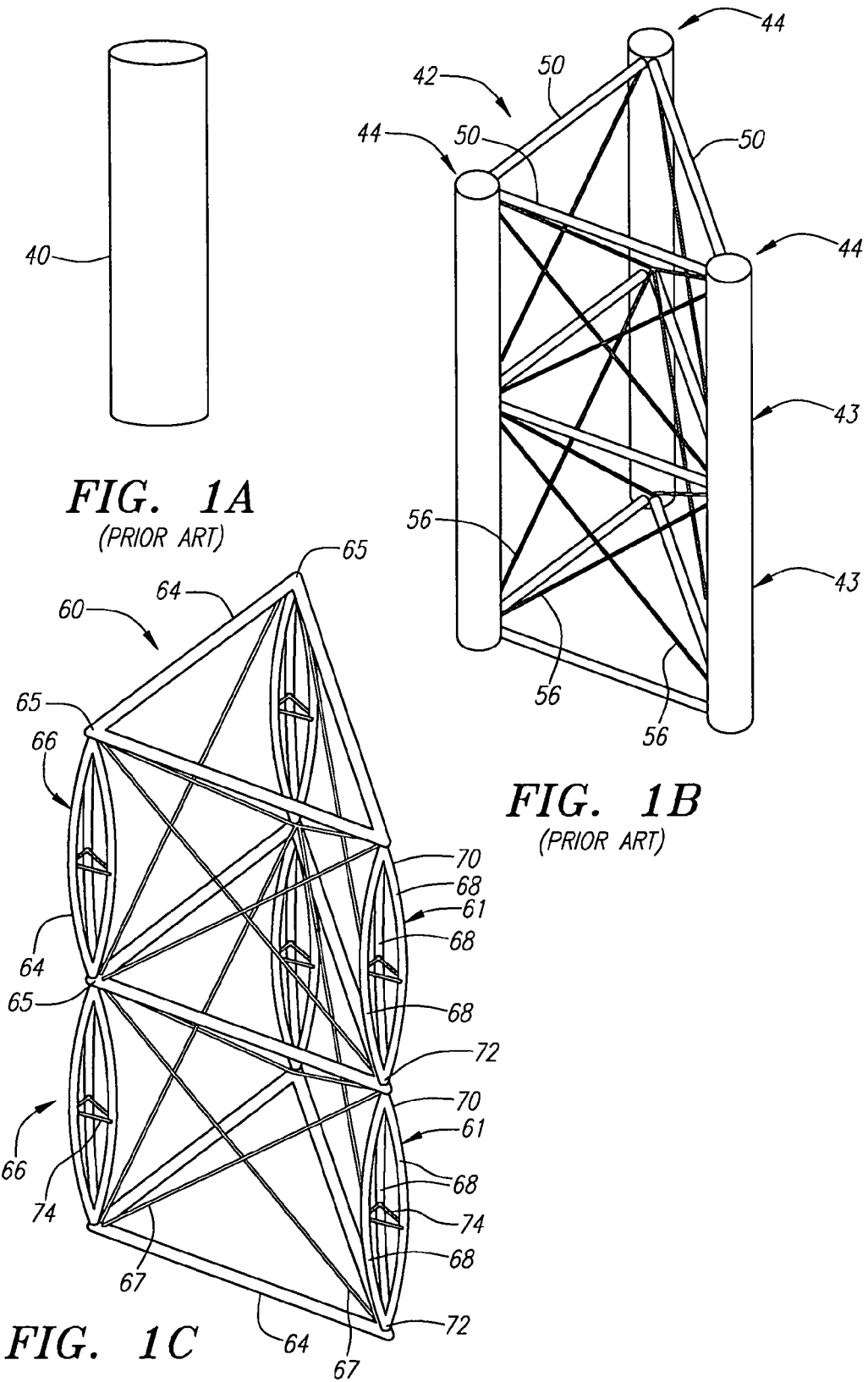
FIGS. 1A-1C schematically illustrate structures exhibiting increasing structural hierarchy.

FIGS. 1A-1D schematically illustrate boom structures exhibiting increasing structural hierarchy. FIG. 1A shows a portion of a boom 40 made from a single solid rod. This is referred to as a $0^{th}$-order structure since there is no latticing structure whatsoever.

FIG. 1B illustrates a portion of a typical prior art lattice boom truss 42. Boom truss 42 comprises three longerons or columns 44. The aggregate area of the three columns 44 approximate the area of the solid rod forming boom 40 of FIG. 1A. Further, the columns 44 are spaced evenly and such that they lie on a circle greater than the diameter of solid boom 40 shown in FIG. 1A. Such column placement gives boom truss 42 a greater section inertia than boom 40 and thus greater structural efficiency. Columns 44 are also braced by battens 50 at regular intervals to form bays 43. Two crossing diagonal cable stays 56 are provided on each face of bays 43 to add additional structural rigidity to boom truss 42. For purposes of the present invention, the boom truss of FIG. 1B is referred to as a first-order truss structure since each of the column members—namely the longerons 44 and battens 50—of the boom truss 42 effectively comprise a single solid rod or tube with one load path.

FIG. 1C illustrates two bays 61 of a deployable boom truss 60 according to one embodiment of the present invention. As discussed more fully below, deployable boom truss 60 may be an articulating truss structure or a coilable truss structure. Deployable boom truss 60 comprises a plurality of column members 64 connected at their ends at node joints 65. Two crossing diagonal cable stays 67 are provided on each face of bays 61 to add additional structural rigidity to deployable boom truss 60. In the present embodiment, the column members 64 forming the longeron elements of bays 61 comprise column assemblies 66. Each column assembly 66 comprises three strut members 68 that are connected to each other at a first end 70 of the column assembly 66 and at a second end 72 of the column assembly. As illustrated, strut members 68 are preferably symmetrically arranged about the centerline of their respective column assembly 66. Each column assembly 66 of the present embodiment also includes a spacer 74 connecting the strut members of the column assembly 66 at a location between the first and second ends 70, 72 of the column assembly 66, and preferably at the mid-point between the two ends 70, 72. Spacers 74 brace the strut members 68 of each column assembly 66 so that they are mutually stabilized and symmetrically spaced from the centerline of their respective column assembly 66. To fit size, and mass, at the node joints 65, however, the strut members 68 are preferably tapered toward the first and second ends 70, 72 of the column assemblies 66.

By locating spacers 74 in the middle of column assemblies 66, as illustrated, the effective buckling length of each strut member 68 is effectively cut in half while the effective diameter, and hence moment of inertia, of the column assembly 66 is increased. Indeed, by spacing strut members 68 about the centerline of column assemblies 66 a distance equal to the radius of columns 44 shown in FIG. 1B, the section inertia of column assemblies 66 will be comparable to that of columns 44. As a result, deployable boom truss 60 of the present invention can provide comparable bending stiffness to that of boom truss 42, yet with substantially less mass.

The deployable boom truss 60 shown in FIG. 1C is considered to exhibit second-order augmentation because the use of column assemblies 66 comprising a plurality of discrete strut members 68, such as rods or tubes, as column members 64 in the truss provides, from a hierarchical standpoint, a second level or order of augmentation to truss 60 in that they provide multiple load paths.

While the column assemblies 66 of the present embodiment include three strut members 68 and one spacer 74, in other embodiments it may be desirable to include more than three strut members 68 or more than one spacer 74. Furthermore, column assemblies 66 could also be substituted for the column members 64 corresponding to the battens in deployable boom truss 60. While deployable boom truss 60 of the present embodiment employs crossing diagonal cable stays 56 to add structural rigidity, in other embodiments a single column assembly according to the present invention could be used as a diagonal member.

Figure 2A:
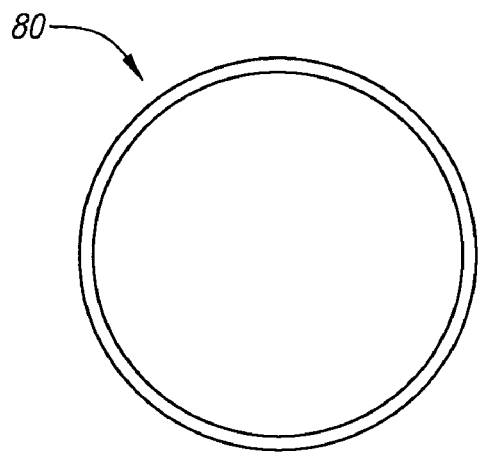
Figure 2D:
Figure 2D:
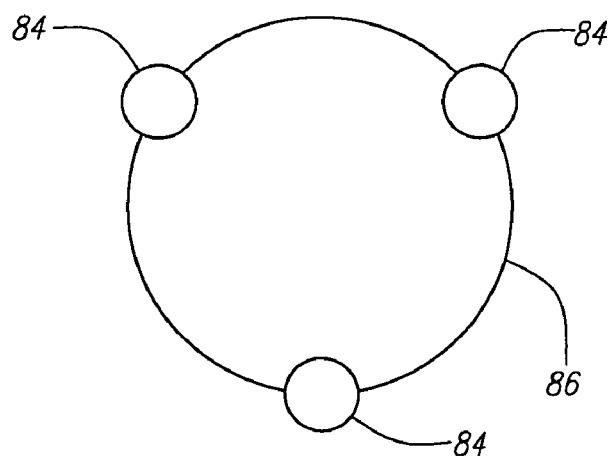

FIGS. 2A-2D are used to further qualitatively illustrate the structural efficiency of using column assemblies according to the present invention as column members in a deployable truss. Consider a thin-walled composite tube 80, as shown in FIG. 2A. Assume that this thin-walled composite tube has the necessary cross-sectional area, section inertia, and minimum wall thickness to satisfy the stiffness and strength requirements of a given application when used as a column member in a deployable truss. FIG. 2B shows a solid rod 82 with the same cross-sectional area (not shown to scale in figures) of the composite tube 80. The solid rod 82 would have the same axial stiffness and strength in tension as tube 80 since they have the same cross-sectional area, but would buckle in compression at a much lower load since the section inertia of the solid rod 82 is much lower than the section inertia of the tube 80. The cross-sectional area of tube 80 could similarly be separated, or stranded, into a number of smaller diameter rods or tubes. For example, FIG. 2C shows the cross-sectional area of tube 80 being divided equally into three solid rods 84. A column formed from the three rods 84 would collectively duplicate the axial stiffness and strength in tension of the original tube 80 shown in FIG. 2A but not its strength in compression, because the section inertia of the three solid rods 84 as arranged in FIG. 2C is much lower than the section inertia of tube 80. Further, the section inertia of the rods 84, as arranged in FIG. 2C, may also be less than the section inertia of the single solid rod 82. But, if, as shown in FIG. 2D, rods 84 are mutually stabilized and equally spaced from the centroid by a spacer so as to lie on a circle 86 equal to the diameter of the original tube 80 as shown in FIG. 2D, the section inertia of the configuration will approximate the section inertia of the original tube 80. Thus, dividing the cross-sectional area of a tube into rods, and spacing those rods equally on a circle equal to the diameter of the original tube will approximate the cross-sectional area and section inertia of the original tube. However, by spacing those rods evenly on a circle of even greater diameter than the diameter of the original tube would make the section inertia of the system of rods greater than the section inertia of the original tube. Similarly, a series of spaced tubes could be used instead of a series of rods to replace the original single tube.

The foregoing qualitative analysis illustrates that the column assemblies 66 of the present invention allow the same amount of material to be used at a larger diameter, as in a mass-optimum, but often unrealistically thin, shell column member, thus permitting column members to be constructed with safe slenderness ratios and with a minimal amount of material.

FIG. 3 illustrates a deployable truss 90 according to another embodiment of the invention in a partially deployed state. Deployable truss 90 comprises a plurality of contiguously attached deployable bays 92. In the present embodiment, bays 92 are in the form of parallelepipeds. Each of the column members of the truss comprise column assemblies 66 according to the present invention. Further, each of the column assemblies 66 is connected at its ends at node joints 94. Joints 94 provide for articulation of the structure at the node. A variety of such node joints suitable for the present application is well known in the art. Diagonal cable stays are also included in deployable truss 90, but have been omitted for clarity.

Deployable truss 90 is a modified version of the deployable truss described in U.S. Pat. No. 5,267,424 (referred to hereinafter as "the '424 patent"), which is hereby incorporated by reference. Deployable truss 90 has been modified from the truss described in the '424 patent in that column assemblies 66 according to the present invention have been employed for the longerons 96 and the battens 98 in the truss. However, deployable truss 90 is otherwise deployed in the same manner as the truss described in the '424 patent.

As further illustrated in FIG. 3, it is also possible to stow flip out rigid panels 99 within the frames formed by the battens 98. Each rigid panel 99 can be made to flip out when its corresponding bay 92 is fully deployed by using lead screws in a manner known in the art. Panels 99 may, for example, be solar cell array panels or synthetic aperture radar (SAR) panels. In either case, panels 99 can be constructed to stow in the same volume as the truss 90 alone.

FIG. 4 schematically illustrates various embodiments of column assemblies according to the present invention. Column assemblies 120, 130, 140, and 150 illustrate column assemblies comprising curved continuous strut members 68 with increasing levels of bracing by spacers 74. Column assemblies 160, 170, 180, and 190 illustrate column assemblies having increasing bracing and employing straight strut elements 192 between bracing points to form strut members 68. Segmenting strut members 68 into straight strut elements 192 between intermediate bracing points provided by spacers 74, as illustrated in column assemblies 160, 170, 180, and 190, will maximize strength and stiffness of the strut members 68. This is because smaller eccentricity of the strut members 68 from an imaginary line connecting spacing positions should increase buckling strength and stiffness of the strut members 68. On the other hand, forming strut members 68 from one section of, for example, a continuous fiber reinforced composite rod or tube that is curved during assembly allows more economical construction of the column assemblies from longer lengths of material. As further illustrated in FIG. 4, the strut members 68 of a column assembly may be braced at an arbitrary number of intermediate locations. However, there is a trade-off between increased bracing and increased mass. As a result, from a mass optimization standpoint there may be a diminishing value of return as the number of bracing points increase. It should also be noted that in certain implementations of the present invention, which are discussed more fully below, it may be desirable not to provide any bracing.

As noted above, eccentricity of the strut members 68 from an imaginary line connecting fixed spacing points of the strut members 68 affects their buckling resistance. Generally, a smaller level of eccentricity results in increased buckling strength and stiffness. As best seen from FIG. 5, if strut members are formed from continuous lengths of material, the angle held when the strut members are bonded into a node fitting can be optimized to minimize eccentricity. FIG. 5 schematically illustrates two column assemblies 200 and 220 according to the present invention. Two strut members 202, 206 of column assembly 200 are shown, and two strut members 222, 226 of column assembly 220 are shown. Strut members 202, 206, 222, and 226 are formed from continuous curved members. In the lower column assembly 200, strut members 202, 206 are permitted to naturally curve from fixed bracing points 214, 216 to the end of the column assembly with a pin-ended connection. As a result, the angle between the strut members 202, 206 and centerline 210, which coincides with the line of action of the buckling load on the column assembly, is fairly large. This in turn results in strut members 202, 206 having some level of eccentricity represented as A in FIG. 5. Moreover, all of the eccentricity of strut members 202, 206 falls outside of imaginary line 209. In the upper column assembly 220, the angle formed between the strut members 222 and 226 at the connection and the centerline 230, which also coincides with the line of action of the buckling lode on the column assembly 220, has been optimized to reduce eccentricity of strut members 222, 226 from imaginary line 229 connecting bracing points 234, 236 and the end of the column assembly. The angle is reduced by connecting strut members 222 and 226 in a fixed end condition and such that the tangent of strut members 222 and 226 at the fixed connection approaches or even aligns with centerline 230. As seen from FIG. 5, by reducing the angle that strut members 222 and 226 approach the end of column assembly 220, the maximum amount of eccentricity of the strut members is reduced by ½ to A/2. Furthermore, the eccentricity of strut members 222, 226 is now more balanced on both sides of imaginary line 229. The angle held by strut members 222 and 226 may be set based on the angle at which the strut members 222, 226 are bonded into the node fittings (not shown). FIG. 5 illustrates merely the practical limiting cases on the variability in eccentricity for a column assembly with a single spacer. Proper angle constraints for structural optimization of columns with other numbers of spacers would be evident to those skilled in the art from the above discussion.

While the column assemblies according to the present invention are not required to be tapered at their ends in all implementations of the invention, failing to taper a latticed column assembly according to the present invention, such as column assembly 66, can increase the size of the node fittings at the connections because a node fitting that has to join strut members 68 that are spaced apart, must by definition be larger. On the other hand, smaller node fittings, having less mass, can be used if the strut members at each end of the column assembly are tapered toward the centerline of the column assembly as illustrated in FIG. 5. Further, by tapering the strut members to minimize eccentricity as illustrated by column assembly 220 of FIG. 5, even smaller node fittings can be used, thereby further improving mass efficiency.

The design of spacers 74 may take on a wide variety of forms depending on the number of strut members 68 selected for the particular column assembly according to the present invention. While a few such possibilities are discussed herein, many other design possibilities will become apparent to those skilled in the art from the instant disclosure.

Figure 6A:
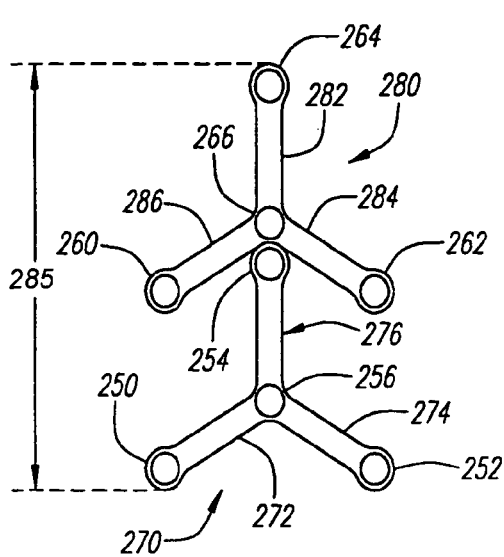
Figure 6B:
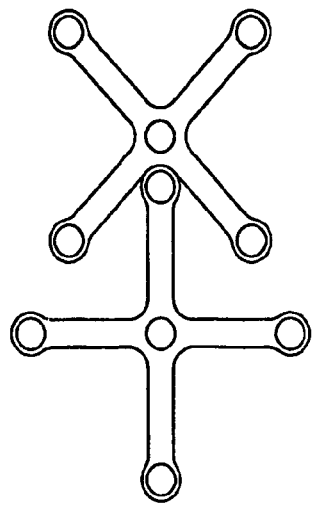
Figure 6C:
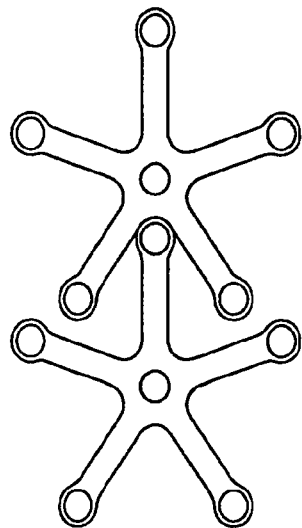
Figure 6D:
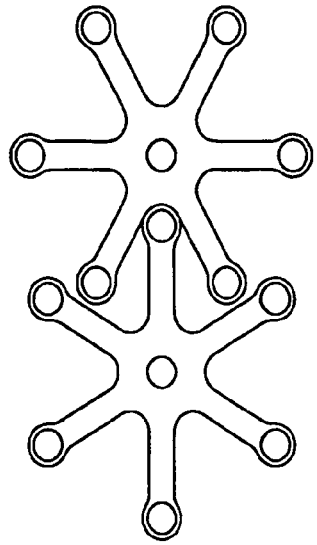

FIGS. 6A-6D show a variety of fixed spacer design possibilities for symmetrically arranging from three strut members in FIG. 6A, to six strut members in FIG. 6D, optimally around an additional single central strut member. Each of the FIGS. 6A-6D also show two nested spacers of each design. For instance, FIG. 6A shows spacer 270 nested with spacer 280. Spacer 270 has three outer strut members 250, 252, and 254 symmetrically spaced from central strut member 256 by legs 272, 274, and 276. Similarly spacer 280 has three outer strut members 260, 262, and 264 symmetrically spaced from central strut member 266 by legs 282, 284, and 286.

The nesting height of a large number of such spacers is the total height of the spacers stacked on top of each other divided by the number of spacers. For example, the stack height of the spacers 270, 280 in FIG. 6A is shown as distance 285 and is approximately the distance between strut member 264 of spacer 280 and strut member 250 of spacer 270. A smaller nesting height generally results in an increase in storage compaction. As shown in FIG. 6A, leg 276 of spacer 270 contacts spacer 280 at central strut member 266 when spacers 270 and 280 are nested. FIGS. 6A-6D collectively demonstrate that spacer designs allowing a central strut member limits the minimum achievable nesting height when stowing multiple spacers of an identical design. Because high compaction is an important goal of all deployable space structures, foregoing a central strand would be advantageous when employing fixed spacers in the column assemblies according to the present invention to improve nesting.

FIG. 7 illustrates the nesting improvement achieved using a V-shaped fixed spacer that does not include a central strand. FIG. 7 shows two V-shaped spacers 300, 320 having legs 308, 310 and 328, 330, respectfully. Spacer 300 spaces strut members 302, 304, and 306, while spacer 320 spaces strut members 322, 324, and 326. The stack height of two spacers 300, 320 of FIG. 7 is distance 334, which is much smaller than the stack height 284 or distance 285 of the two spacers 270, 280 shown in FIG. 6A. Indeed, the V-shaped fixed spacer design illustrated in FIG. 7 would permit a large number of column assemblies employing such spacers to be stacked in approximately one-fourth the height of tubular columns having a diameter equal to the effective diameter of the column assembly.

In connection with FIGS. 2A-2D discussed earlier it was shown that the section inertia and cross-sectional area of a tube, FIG. 2A, can be approximated by three rods 84 separated such that they are equidistant and lying along a diameter equal to the diameter of the original tube as shown in FIG. 2D. The rods 84 of FIG. 2D are positioned similarly to the strut members shown in FIG. 7 such that strut members braced by each spacer 300, 320 of FIG. 7 approximate the section inertia and cross-sectional area of an equivalent tube. The equivalent tube would be of the same cross-sectional area as the sum of the area of the three strut members (e.g., strut members 302, 304, 306) with the wall of the tube tracing a path through a perpendicular cross-section of the three strut members 302, 304, 306. FIG. 7 illustrates that by employing fixed spacers in the column assemblies according to the present invention the cross-sectional area and section inertia of two tubes can be nested into a space that approximates the height of only a single tube. Specifically, the distance 334 in FIG. 7, the nesting height of the two spacers, is only slightly more than the diameter of the equivalent tube—i.e., the tube with the same cross-sectional area and section inertia of the three strut members 302, 304, 306 separated by spacer 300 or the three strut members 322, 324, 326 separated by spacer 320. It will be appreciated that the savings in stowage volume will be significantly multiplied as additional column assemblies employing the V-shaped spacer design are nested together.

While the properties, cross-sectional area and section inertia, of a tubular section can be duplicated by stranding—placing members equidistant on a circle equal to the diameter of the original tube—stranding can produce a structure with even greater section inertia than the original tube if the members are positioned equidistant on a circle greater than the diameter of the original tube. This may be desirable, because in a first-order deployable truss the tubular elements could well be approaching slenderness ratio limits to optimize packing. Using column assemblies with larger diameters also allows a truss structure to be designed with longer bays. This allows an advantageous tradeoff in overall packing and cost, given that fewer elements are needed for a given overall length structure. An example of such a truss structure is illustrated in FIGS. 8A-8D.

FIGS. 8A-8D illustrate another embodiment of a deployable truss structure 360 employing second order augmentation according to the present invention. Truss structure 360 may be used to deploy a number of panels 366 and panels 368. Panels 366 may, for example, be SAR panels, and panels 368 may, for example, be solar panels, or vice versa. FIG. 8A shows the deployable truss structure 360 in a stowed position and situated on satellite 350. In this stowed position the truss structure 360 along with panels 366 and 368 could be sized to fit within the cargo space of a standard launch vehicle, such as a Delta IV-M or Delta IV-Heavy rocket.

FIG. 8B shows the truss structure 360 during deployment wherein the panels 366 and supporting column members are deployed. The panels 366, 368 deploy automatically with bays 370 of the truss structure 360. Bays 370 unfold at node joints 400 providing for articulation of the truss structure 360. The other elements of the truss structure 360 are seen more clearly in FIG. 8C where a portion of the truss structure 360 is shown during deployment, and FIG. 8D where a portion of the truss structure 360 is shown fully deployed. The sides of each bay 370 comprise column assemblies 384 acting as longeron members, and column assemblies 380 acting as diagonal members in the truss structure 360. Each face of a bay 370 also includes two column members 386 acting as battens. Column assemblies 380 and 384 each comprise a plurality of strut members connected to each other at the ends of each column assembly 380, 384. Further, in the present embodiment, each column assembly 380, 384 is provided with three V-shaped spacers 390, like the ones illustrated in FIG. 7, to space the struts away from the centerline of the column assemblies 380, 384.

When fully deployed, the truss structure 360 carries panels 366 on one side and panels 368 on the opposite side. The deployed volume of the multipanel structure is orders of magnitude greater than its stowed volume. For example, a deployable truss structure 360 employing the second order augmentation of the present invention can be designed to stow within the payload area of a Delta IV-Heavy rocket yet when fully expanded measure over 500 m long. By comparison, using conventional deployable truss technologies, a deployable truss having a deployed length of only 300 m could fit within the same payload area.

The column assemblies, and hence the truss structures, according to the present invention can be stowed more compactly if the strut members are spaced with a deployable spacer instead of a fixed spacer. Because it has been analytically found that the stiffness of the column assemblies is relatively insensitive to spreader stiffness and that the energy required to spread the strut members is relatively small, a wide variety of deployable spacer designs are possible. Various deployable spacers for separating four strut members and their corresponding configuration for strut member deployment are illustrated in FIGS. 9A-9F. The strut members are separated by a strained hoop in FIG. 9A, a hinged cross-brace in FIG. 9B, a sprung frame in FIG. 9C, carpenter tape strips in FIG. 9D, an inflatable sphere in FIG. 9E, and inflatable bellows in FIG. 9F. The methods used to spread the strut members can thus, for example, include the use of strain energy, elastic memory composites, and inflation gas. A chart listing some of the pros and cons of the different methods to spread the rods is included in Table 1, below.

TABLE 1

Spreader Methods - Pros/Cons

| Spreader Options | Pros | Cons |
| --- | --- | --- |
| Plumbed gas inflatable | known actuation time<br>high force margin potential<br>releasable for stowage | plumbing mass & routing<br>reliability<br>no spread until entire mast is deployed<br>gas storage overhead<br>not resettable |
| UV-triggered gas pellet inflatable | localized energy source<br>may be triggered after boom transition, but sequencing reliability is questionable | sequencing reliability is questionable<br>requires shading canister to prevent actuation while stowed<br>technology is not yet fully developed |
| Thermally-actuated shape-memory | deployment spring may be structural<br>localized energy source | has similar spring mass overhead as spring-loaded<br>heater mass<br>technology is not yet fully developed |
| lanyard-actuated | known actuation time | requires an external actuator<br>no spread (reinforcement) until entire mast is deployed<br>imposes additional axial force to longeron; may induce buckling<br>lanyard overhead |
| spring loaded sliding inks | passive actuation<br>material stows outside of rod bundle (fold flat for stowage)<br>existing technology<br>high reliability<br>testable, resettable<br>localized energy source | spring mass overhead<br>Link misalignment w/rod centerline<br>may limit effectiveness |

Figure 9A:
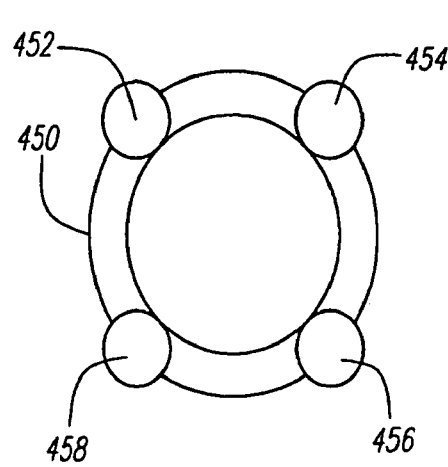
Figure 9D:
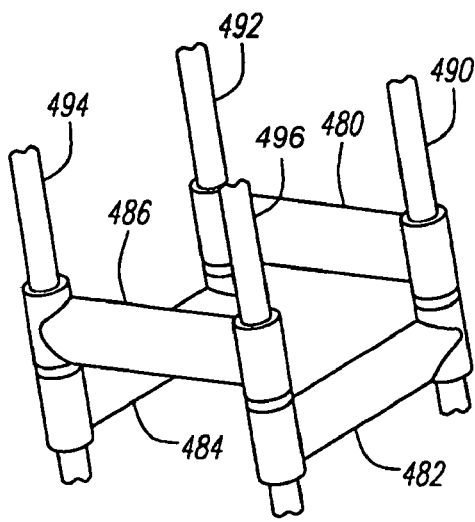
Figure 9B:
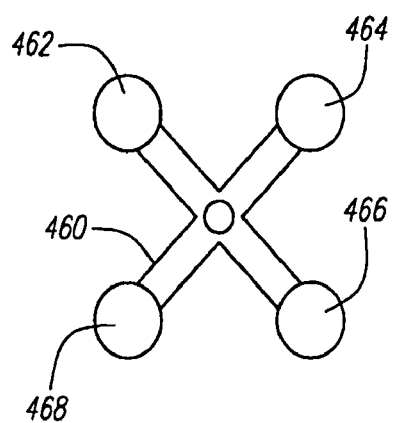
Figure 9E:
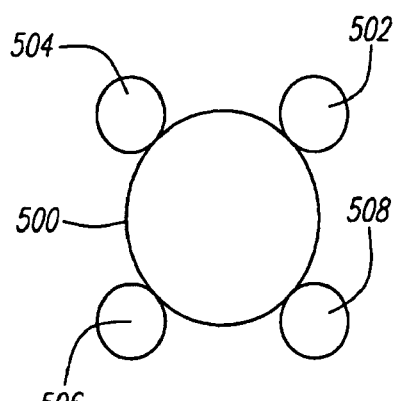
Figure 9C:
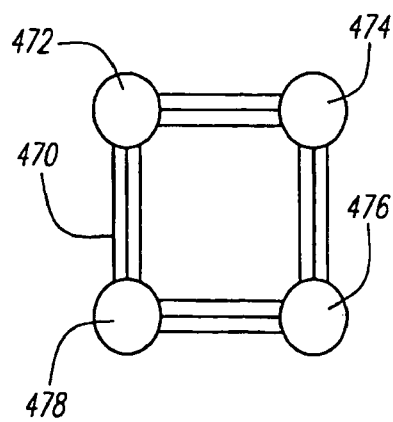
Figure 9F:
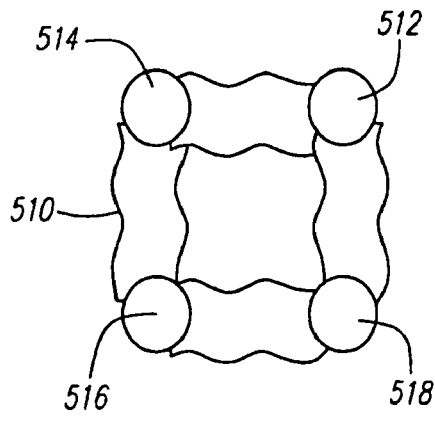

Reviewing the various deployable spacers in more detail, FIG. 9A shows a strained hoop 450 separating strut members 452, 454, 456, and 458. FIG. 9B shows a hinged cross-brace 460 separating strut members 462, 464, 466, and 468. FIG. 9C shows a sprung frame 470 separating strut members 472, 474, 476, and 478. FIG. 9D shows a deployable spacer comprising carpenters tape strips 480, 482, 484, and 486 that separate strut members 490, 492, 494, and 496. FIG. 9E shows inflatable sphere 500 separating strands 502, 504, 506, and 508. FIG. 9F shows inflatable bellows 510 separating strands 512, 514, 516, and 518. It will be appreciated that the deployable spacer designs of FIGS. 9A-9F may also be used with many different variations on the number of strut members, instead of the four strut members shown in FIGS. 9A-9F. In addition, many different design possibilities for deployable spacers will become apparent to those skilled in the art from the instant disclosure.

FIGS. 10A-10C show the deployment of strut members separated by the hinged cross-brace 460 of FIG. 9B. FIG. 10A shows strut members 562, 564, 566, and 568 in a stowed position with hinged cross-brace 460 collapsed. FIG. 10B shows strut members 562, 564, 566, and 568 in a deployed position with hinged cross-brace 460 expanded. FIG. 10C is a close up view of leaf catch 569 on hinged cross-brace 460. Leaf catch 569 secures hinged cross-brace 460 in the deployed position so that it cannot collapse after deployment, for example from the application of a tensile force to the column assembly.

FIGS. 11A and 11B show the deployment of strut members 590, 592, 594, and 596, using a deployable spacer formed from carpenter tape strips 580, 582, 584, and 586. FIG. 11A shows the strands in a collapsed position, while FIG. 11B shows the deployed position with the carpenter tapes expanded. In the collapsed state, the carpenter tape strips are wound on spools 597.

FIGS. 12A-12C show the deployment of column assembly with strut members separated by a hinged/sliding spacer 600, an embodiment of the sprung frame concept of FIG. 9C. This arrangement has several favorable characteristics: it is self-actuated by the coilable deployment kinematics; it stows compactly around the strut members; it is readily reset for repeated stow/retract cycles, facilitating ground testing; and it is readily incorporated into standard designs as an add-on. These are all critical features, and none of the competing concepts that were considered possessed all of these features. Additionally, the practicality of designing, fabricating, and testing this arrangement is clearly greater than a number of alternative deployable spacer designs.

The hinged/sliding spacer 600 provides a very compact stowage volume, with springs 620, 622, 624 using the same volume around the strut members or rods 602, 604, 606 as the fixed and sliding fittings. This dimension is key to allowing the column assembly to stow as compactly as allowed by the strut members or rods 602, 604, 606 themselves.

Additionally, it was found analytically and by demonstration with the test hardware, that the hinged/sliding spacer 600 is well restrained by the bent condition of the stowed strut members, and that the spreader will deploy by itself as soon as the strut members or rods 602, 604, 606 straighten. This passive method is very attractive for many reasons: it does not require external actuators requiring power or telemetry; the actuation source is distributed, preventing a single failure from affecting other elements; and the spreader springs do not load the structure except directly where the spreading action is occurring. This is not the case for centrally actuated spreaders with control lines running axially along the mast or otherwise through the truss structure.

Referring to FIG. 12A, hinged/sliding spacer 600 is shown in a stowed position with collapsed rods 602, 604, and 606. FIG. 12B shows hinged/sliding spacer 600 in mid-deployment. Hinged/sliding spacer 600 comprises hinged legs 610, 612, and 614 and springs 620, 622, and 624. The first leg 610 of hinged sliding spacer 600 connects rod 602 to rod 604, the second leg 612 connects rod 606 to rod 602, and the third leg 614 connects rod 604 to rod 606. Spring 620 acts on the first leg 610, spring 624 acts on the second leg 612, and spring 622 acts on the third leg 614. Each leg of the hinged/sliding spacer 600 comprises a lower and upper collar 640, 644 a pivot arm 642, and two pivot pins 646, 648. The upper collar 644 of each leg of the hinged/slider spacer is fixed to its respective rod.

Lower collar 640 of leg 614 slides over rod 604, upper collar 644 which is fixed to rod 606 through pin connection 650, and pivot arm 642 is connected to the upper collar 644 through pivot pin 648 and connected to the lower collar 640 through pivot pin 646. During deployment, springs 620, 622, and 624 expand forcing the lower collars on the hinged/slider spacer higher up their respective rods. Each lower collar has a fixed tab 632 that mates with a recess 630 on each of the upper collars. FIG. 12B shows fixed tab 632 on lower collar 640 of slider leg 614. Fixed tab 632 mates with recess 630 on the upper collar of leg 610.

FIG. 12C shows the hinged/slider spacer 600 in its deployed position. Springs 620, 622, and 624 are fully extended and each of the lower collars is contacting the upper collar on the same rod with the lower and upper collars rotatably fixed through the mating of the fixed tab 632 on the lower collar residing in the recess 630 of the upper collar on the same rod.

As noted above, the column assemblies according to the present invention can also be incorporated into coilable trusses to provide them with the benefits of second order augmentation. A preferred configuration of a coilable truss 800 according to the present invention is depicted in FIG. 14. Coilable truss 800 comprises a plurality of column members, including column assemblies 802 and battens 804, connected at their ends at truss nodes 806. Column assemblies 802 comprise a plurality of strut members 810 connected to each other at a first end 812 of the column assemblies 802 and at a second end 814 of the column assemblies 802. In the present embodiment, each column assembly 802 further comprises a deployable spacer 816 connecting the strut members 810 of the column assembly 802 at a location between the first and second ends 812, 814 of the column assembly 802. However, in other embodiments of a coilable truss according to the present invention, no spacer is used. Preferably, a deployable spacer connects the strut members 810 near the midpoint between the first and second ends 812 and 814. If more than one deployable spacer 816 is included in each column assembly 802, they are preferably spaced approximately equally between the first and second ends 812, 814 of the column assembly 802.

Any of the deployable spacers previously described can be used in the column assemblies 802 according to the present embodiment. However, those that are elastically deployed are particularly well suited for the present application. Deployable spacer 816 collapses when the truss assembly is in its collapsed state and expands to a deployed configuration that radially expands the strut members 810 away from the longitudinal centerline of the column assembly 802 when the truss 800 is in its deployed state. Deployable spacers 816 preferably symmetrically arrange their respective strut members 810 around the centerline of their respective column assembly 802 when truss 800 is in its deployed state.

In the present embodiment, column assemblies 802 form three longerons 818 that are arranged parallel to one another and that extend the length of the truss. Further, strut members 810 are continuous members that extend the length of longerons 818. As a result, longerons 818 are jointless and strut members 810 pass between truss nodes 806 between contiguous column assemblies as illustrated in FIG. 15. As also illustrated in FIG. 15, the column assemblies 802 of the present embodiment each include four strut members 810, but in alternative embodiments, three or more strut members may be employed. Longerons 818 are connected to a pair of end plates (not shown) in manner customary to conventional coilable trusses. Battens 804 brace the three longerons 818 at regular intervals corresponding to the ends of the column assemblies 806 to define a plurality of bays 819 along the length of the truss 800. In alternative embodiments of the invention, battens 804 may be replaced with column assemblies 802 according to the present invention or radial spacers, such as in U.S. Pat. No. 4,918,884. Diagonal cable stays 820 are stretched between opposing truss nodes 806 on each face of the bays 819 in a conventional manner.

Coilable truss 800 is collapsed and deployed using conventional methods. To collapse truss 800, the longerons 818 are elastically buckled between battens 804 so as to coil the longerons between the endplates (not shown).

As illustrated in FIG. 15, coilable longerons 818 are preferably assembled so that the strut members 810 have a running shallow helical twist along the length of the longeron to prevent detrimental spreading when the longeron 818 is coiled. This spreading, or "brooming" action is the result of the strut members 810 attempting to all move towards the neutral axis and minimize their axial strain energy. If the strut members 810 follow a helical path they are not required to strain axially when the longeron 818 is bent or coiled. In other words, by adding an appropriate amount of helical twist along the length of the stranded longeron 818, each strut member 810 of the longeron 818 will have the same average or net path length, thereby eliminating or minimizing axial strain.

The use of column assemblies 802 having deployable spacers in a coilable lattice structure allows for the possibility of creating a deployable coilable lattice structure with considerably greater cross-section than conventional coilable trusses would permit. Such a lattice structure can be easily coiled for storage with acceptable strains since the strain is directly related to the diameter of the strut members 810. In addition, because the strut members 810 of the column assemblies are of a much smaller diameter than the diameter of the tubes or rods in conventional coilable trusses, the stowed strain energy can be much lower in the coilable trusses of the present invention compared to the stowed strain energy in a conventional coilable truss structure. Alternatively, because stowed strain energy can be significantly reduced by employing the secondary augmentation technique of the present invention, the size of the deployment equipment can be reduced, thereby reducing the parasitic mass associated with the truss 800.

FIG. 13 illustrates a range of stranding options for strut members of column assemblies according to the present invention. Near the center of FIG. 13 is shown a cross-section of a column, depicted as a circular rod 700, that is to be replaced with a column assembly according to the present invention. Circular rod 700 could also be a tube. Circular rod 700 could be a member of a lattice truss, such as a batten, diagonal or longeron. Referring to FIG. 12, moving vertically up from rod 700, there is a column 705 formed from three circular rods, with the cross-sectional area of each of the three rods that comprise column 705 being one third the cross-sectional area of circular rod 700. Thus, the sum of the cross-sectional area of the three rods of column 705 is the same as the cross-sectional area of circular rod 700. Replacing rod 700 with column 705 is one of the simplest embodiments of a column assembly according to the present invention. Such a replacement is referred to as "stranding." In a slight variation of this embodiment, the three rods of column 705 could be twisted about their collective centerline to limit brooming as discussed above if used in a coilable truss application.

Moving vertically up from column 705 is column 710, an example of stranding with seven rods with constant total cross-sectional area. Moving vertically up from column 710 is column 715, an example of stranding with even more rods. Columns 705, 710, and 715 are examples of stranding with constant total cross-sectional area.

Another stranding option is to replace the original rod with multiple rods where every replacement rod has a cross-sectional area equal to the cross-sectional area of the original rod. Under this type of stranding, the replacement of a single rod with five rods results in a column structure that has five times the cross-sectional area and many times the section inertia of the original rod. Moving vertically down from rod 700 in FIG. 13 are additional examples of this type of stranding. Columns 720, 730, and 740 are examples of stranding with multiple rods where each of the replacement rods have the same area as the original rod.

All of the columns reviewed so far, columns 705, 710, 715, 720, 730, and 740, are configured so that all of their constituent members are adjacent to each other. An optional configuration for stranding is separating the strands or strut members to provide spacing between them. Examples of such configurations are shown as columns 750, with three rods equivalent to the three rods of 720. The constituent rods of column 750 are separated by fixed spacer 752 providing a small separation between the rods of column 750. The constituent rods of columns 755 and 760 are separated by fixed spacers 757 and 762, respectfully, with each of those fixed spacers providing approximately the same spacing as fixed spacer 752. It is also possible to provide a relatively large separation between the rods. The rods in column 770, for example, are spaced far apart compared to the diameter of the constituent rods by fixed spacer 772. While fixed spacers are shown in FIG. 13, the expanded spacing may be achieved with a fixed or deployable spacer as discussed earlier. Further, the number of spacers used along the length of a bay element can be increased to provide support to prevent local buckling and thus achieve the desired column strength. Preferably element sizing, quantity, maximum spacing diameter along the tapered column, and number of spacers is chosen to equalize local strand or strut member buckling with column assembly buckling and global column buckling when optimizing mass.

As will be appreciated by those skilled in the art, there are numerous possible configurations for stranding with multiple rods including, without limitation, using replacement rods of unequal cross-sectional area, rods of non-uniform shape, unsymmetrical configurations of the replacement rods, and others. Any combination of cross-sectional spacing, strand number, and size may be considered when optimizing a design for its particular requirements.

Even if the original rod 700 possessed adequate structural properties, stranding may be advantageous. For example, stranding may provide a measure of redundancy since the failure of any one of the rods in column 705 would still allow the remaining rods of column 705 to provide structural support. One potential failure mode of column members used in trusses deployed in space is a micrometeoroid or orbital debris particles impacting the column member. In a column assembly according to the present invention, such an impact could impair the structural capability of one or more of the rods in a column assembly without causing catastrophic failure of the truss. The use of column assemblies according to the present invention, therefore, increases the probability that the structural capacity of an entire column member in a truss would not be lost to such an impact. The probability of surviving such an impact can be increased by providing spacing between the multiple rods of a column assembly such as with columns 750, 755, 760 or 770 shown in FIG. 13.

For example, the option for small separation of the strands provides structural redundancy in the event of a micrometeoroid or orbital debris particle impact. This is suggested by the examples shown to the left of center in the FIG. 13.

Other advantages of stranding include increased flexibility, thereby allowing stranded rods to be manufactured from stiffer material, such as graphite epoxy composites. Increased flexibility also provides easier coiling of stranded rods, allowing the use of larger rods. Another advantage of increased flexibility is the use of a smaller and lighter release mechanism to throttle the deployment of a coilable truss.

Often, coilable lattice designs are limited in their structural stiffness and strength for a given overall structure diameter by the strain that the longeron material can withstand. The strain is calculated by the longeron strand diameter over the structure diameter. Heritage glass fiber coilables are typically designed to 1.5% strain. Using graphite fiber composites may restrict the usable longeron diameter by a factor of three or more. By stranding the longeron, a greater total area of material can be utilized. This allows the designer to take advantage of the stiffness-to-weight performance of graphite fiber composites without the achievable area (stiffness) being limited by stowed strain.

As mentioned previously, when an element is stranded, the amount of total fiber that can be incorporated and still be bent for storage increases enormously. This is of obvious benefit to the axial stiffness of the element. But strength in compression is quickly lost because the buckling strength of the individual strand areas is much less than if the areas acted as one. To achieve the full strength potential, the strands must be held together as one. Development tests with a stranded helixed coilable longeron have shown that friction alone provides a substantial strength increase.

However, multiple methods of fusing the strands or strut members of a non-expanded column assembly together (after deployment) to obtain more substantial resistance to strand separation (and hence individual buckling) are possible. For example, a rigidizable resin, such as a thermoplastic resin or UV curable resin could be employed in such applications. Preferably, a thermoplastic resin is employed so that deployments of the structure could be repeated on the ground to prove reliability prior to use in orbit.

The utility of this configuration is multi-fold. For example, the thermoplastic resin may be heated to a state where the resin softens. This would allow the strands to shear slowly and the structure would slowly deploy, driven by the strain energy contained in the bent strands. Once the structure was fully deployed, the heater would be turned off and the resin would rigidize as the temperature of the stranded longeron cooled below the softening point of the resin. Stranding a helixed longeron allows a much larger aggregate area longeron to be stowed in a given stowed mast cylinder volume. Rigidizable resin interspersed between the strands also allows the full strength of the strands working as one to be realized in the deployed configuration.

The heating of the thermoplastic resin may be carried out by nickel-chrome wires that are wrapped in or around the individual strut members of the column assemblies or which are formed within the individual strands during the manufacturing process. If a graphite fiber reinforced composite material is used to form the individual strut members of the column assemblies then the individual strut members may be heated by simply passing current through the graphite reinforcing fiber material.

In summary, the second order augmentation technology of the present invention provides a number of important equal or advantageous characteristics relative to other deployable space structures, particularly shell structures.

First, a deployable structure can be configured as a lattice structure. Lattice structures are more advantageous than shell structures for several reasons. Shell structures are susceptible to thermal bending, which prevents them from being stable, highly dimensionally accurate structures. Additionally, shell structures cannot be well-optimized for mass given gossamer load conditions. The "optimum" shell wall is too thin to manufacture without imperfections and the column is therefore prone to catastrophic buckling. Lattice structures are not as susceptible to thermal bending as a closed shell, as the sun can shine on structural elements on all sides of the boom at the same time.

While variants of the common lattice structure are preferred and well utilized, according to the present invention, reformation of the required structure area in the first-order lattice into stranded column assemblies will allow further advantages. One example is tighter stowed packaging. Open lattice column assemblies can be nested to increase compaction by at least a factor of 4. The basic structural advantages of a lattice over a thin-walled shell are realized again with the secondary latticing. Thus, the realization of higher mass efficiency and compaction benefits are compounded.

An articulated truss structure having second order augmentation obtains all these benefits while preserving the reliable deployment characteristics of heritage articulated lattice structure. Namely, determinate kinematics and viable loads paths during deployment.

An additional unique feature of truss structures with second order augmentation is that under overload conditions failure is not catastrophic. Shell buckling is not recoverable, but the individual elements of a stranded column assembly structure will buckle appreciably without material yield or rupture.

The second order augmentation technology of the present invention also allows more mass optimum configurations of high performance graphite composite material to be arranged to form stable, low coefficient of thermal expansion (CTE) structures. Numerous low cost methods allow the arrangement of continuous fibers, which are nearly axially oriented for maximum stiffness and minimum CTE. For example, continuous lengths of unidirectional material can be fabricated by pultrusion and then used in short lengths or longer curved sections bonded into segments of articulating column assemblies, or full global column lengths if, for example, it is used in a coilable lattice structure.

Filament winding may be used to over-wrap pultruded uniaxial material to force the overall material CTE to a desired value, such as zero. Filament winding may be used over other lighter core materials, such as foam, to create lighter more mass efficient elements as applicable for lower load carrying requirements.

When the column assemblies of the present invention are continuous, as in the coilable lattice application, the reduced number of joints reduces the cost of assembly further. Additionally, the elimination of joints eliminates deadband which increases stability.

Column assemblies of the present invention may also beneficially replace any or all elements of a truss structure as all elements, by definition, carry only axial load. Thus, for example, longeron, batten and diagonal elements are all viable candidates for substitution with the column assemblies of the present invention.

We claim:
1. A deployable truss comprising:
   a plurality of column members connected at their ends to form a deployable truss that forms a rigid structure in a deployed state and that has a stowage volume less than its deployed volume in a collapsed state, wherein at least one of the plurality of column members comprises a column assembly having at least one tapered end, the column assembly including at least three strut members, each strut member of the column assembly being connected to each other strut member of the column assembly at a first end of the column assembly and at a second end of the column assembly.

2. The deployable truss of claim 1, wherein the at least three strut members of the column assembly are substantially symmetrically arranged about a longitudinal centerline of the column assembly.

3. The deployable truss of claim 1, wherein the at least three strut members of the column assembly are further connected to each other at a location between the first and second ends of the column assembly when the deployable truss is in the deployed state.

4. The deployable truss of claim 3, wherein the at least three strut members of the column assembly are rigidly connected using a rigidizable resin.

5. The deployable truss of claim 4, wherein the rigidizable resin comprises a thermoplastic resin.

6. The deployable truss of claim 4, wherein the rigidizable resin comprises a UV curable resin.

7. The deployable truss of claim 3, wherein the at least three strut members of the column assembly exhibit a substantially helical twist about a longitudinal centerline of the column assembly.

8. The deployable truss of claim 1, wherein the column assembly further comprises a spacer connecting the at least three strut members of the column assembly at a location between the first end and the second end of the column assembly.

9. The deployable truss of claim 8, wherein the spacer connects the at least three strut members of the column assembly near a midpoint between the first and second ends of the column assembly.

10. The deployable truss of claim 8, wherein the spacer is collapsible to a stowed configuration when the deployable truss is in the collapsed state and expandable to a deployed configuration that radially spaces the at least three strut members of the column assembly away from a longitudinal centerline of the column assembly when the deployable truss is in the deployed state.

11. The deployable truss of claim 8, wherein the spacer comprises a rigid spacer that radially spaces the at least three strut members of the column assembly away from a longitudinal centerline of the column assembly a fixed distance in both the deployed and collapsed states.

12. The deployable truss of claim 11, wherein the spacer is substantially V-shaped.

13. The deployable truss of claim 8, wherein the at least three strut members of the column assembly taper toward a longitudinal centerline of the column assembly at the first end and the second end of the column assembly when the deployable truss is in the deployed state.

14. The deployable truss of claim 1, wherein each column assembly further comprises a plurality of spacers connecting the at least three strut members of the column assembly, each of the plurality of spacers connecting the at least three strut members of the column assembly at a different location between the first end and the second end of the column assembly.

15. The deployable truss of claim 14, wherein each spacer is collapsible to a stowed configuration when the deployable truss is in the collapsed state and expandable to a deployed configuration that radially spaces the at least three strut members of the column assembly away from a longitudinal centerline of the column assembly when the deployable truss is in the deployed state.

16. The deployable truss of claim 14, wherein each spacer comprises a rigid spacer that radially spaces the at least three strut members of the column assembly away from a longitudinal centerline of the column assembly a fixed distance in both the deployed and collapsed states.

17. The deployable truss of claim 16, wherein each spacer is substantially V-shaped.

18. The deployable truss of claim 17, wherein the spacer of each column assembly is arranged to permit nesting with the spacer of another column assembly when the deployable truss is in the collapsed state.

19. The deployable truss of claim 14, wherein the at least three strut members of the column assembly taper toward a centerline of the column assembly at each of the first end and the second end of the column assembly when the deployable truss is in its deployed state.

20. The deployable truss of claim 1, wherein at least one of the at least three strut members comprises a tube.

21. The deployable truss of claim 1, wherein at least one of the at least three strut members comprises a rod.

22. The deployable truss of claim 1, wherein each of the at least three strut members is formed from a continuous fiber reinforced composite material.

23. The deployable truss of claim 22, wherein the continuous fiber reinforced composite material comprises glass fibers.

24. The deployable truss of claim 22, wherein the continuous fiber reinforced composite material comprises graphite fibers.

25. The deployable truss of claim 1, wherein each end of the column assembly is tapered.

26. A deployable truss comprising:
a plurality of column members connected at their ends to form a deployable truss that forms a rigid structure in a deployed state and that has a stowage volume less than its deployed volume in a collapsed state, wherein at least some of the plurality of column members comprise column assemblies including a plurality of strut members, each strut member of an associated column assembly being connected to each other strut member of the associated column assembly at a first end of the column assembly and at a second end of the column assembly, wherein strut members of a column assembly are further connected to each other at a location between the first and second ends of the column assembly when the deployable truss is in the deployed state, and wherein at least some of the strut members of the plurality of strut members of the column assembly exhibit a substantially helical twist about a longitudinal centerline of the column assembly.

* * * * *